Figure 1:
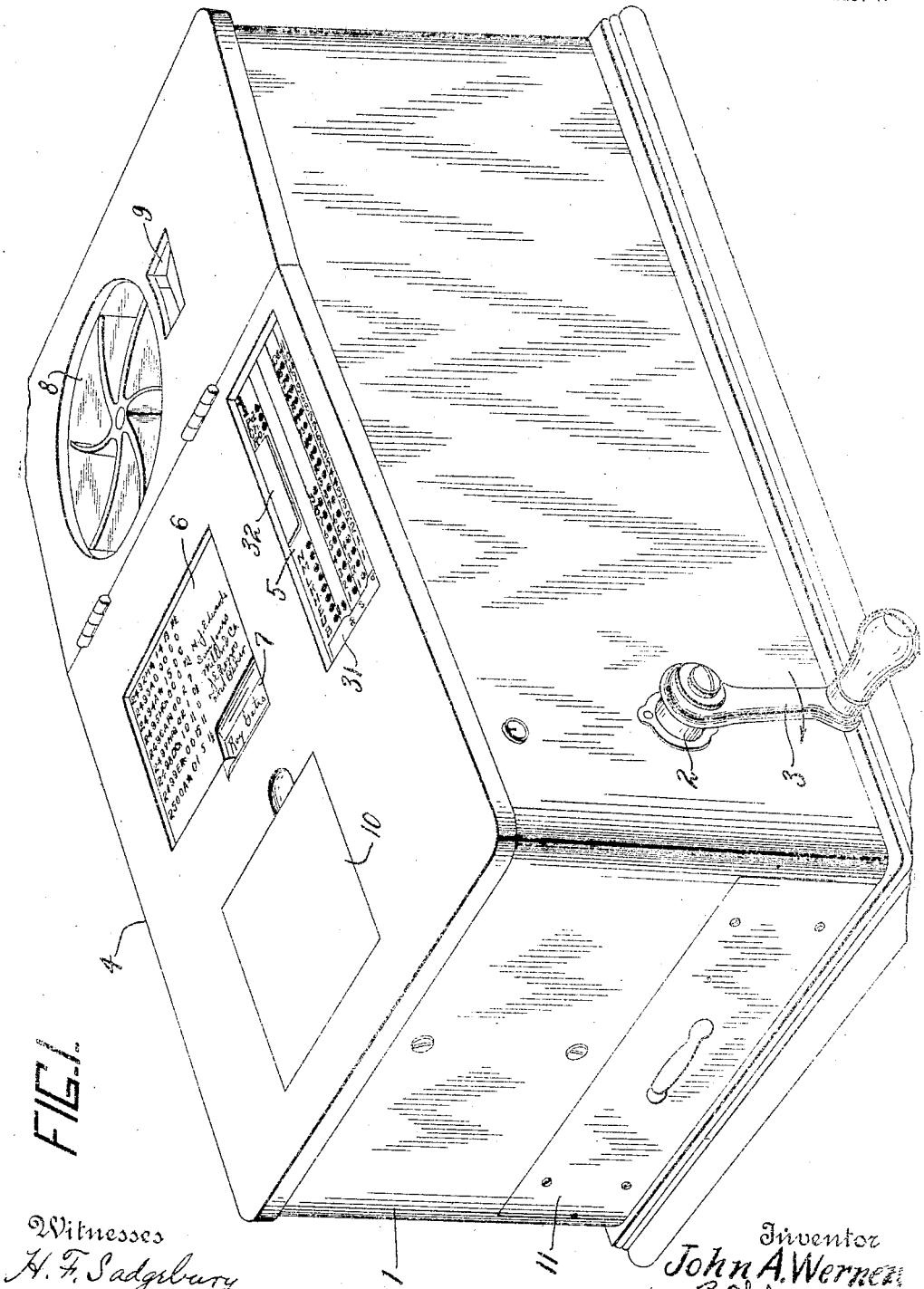

J. A. WERNER.
CASH REGISTER.
APPLICATION FILED DEC. 22, 1911.

1,161,094.

Patented Nov. 23, 1915.
13 SHEETS—SHEET 2.

Witnesses
H. F. Sadgebury
J. B. Ricketts

Inventor
John A. Werner
by R. Chase
and C. H. Braselton
Attorneys

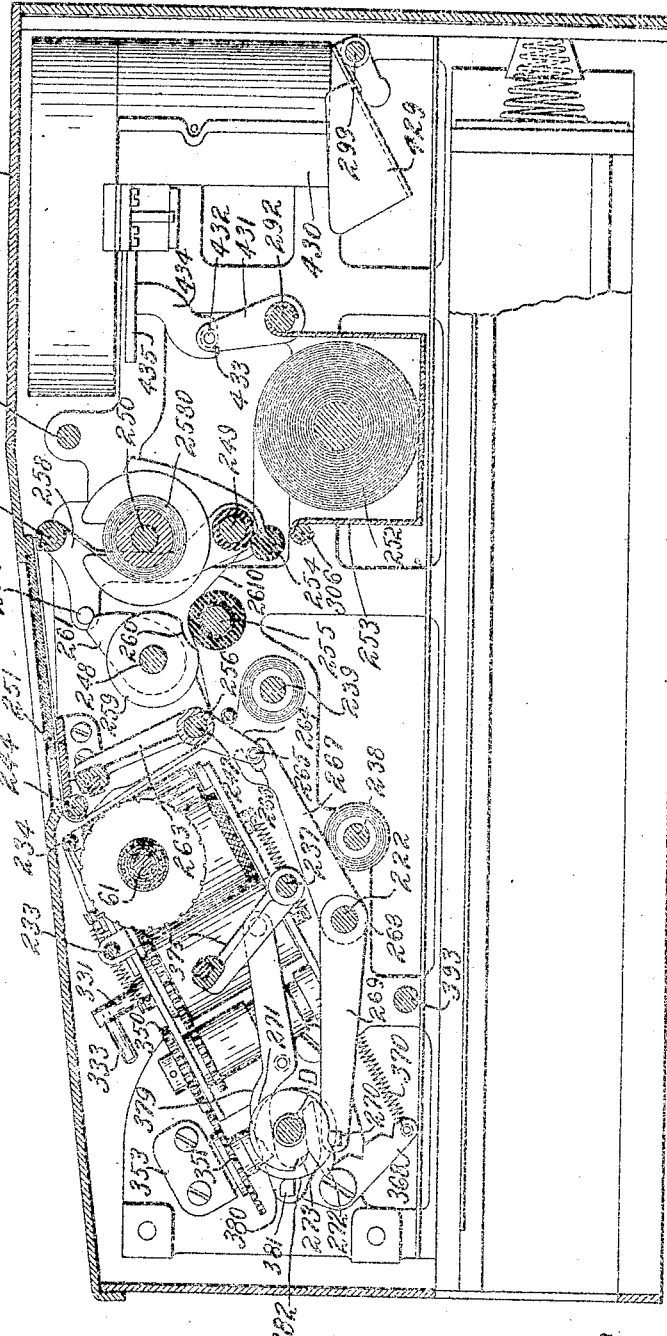

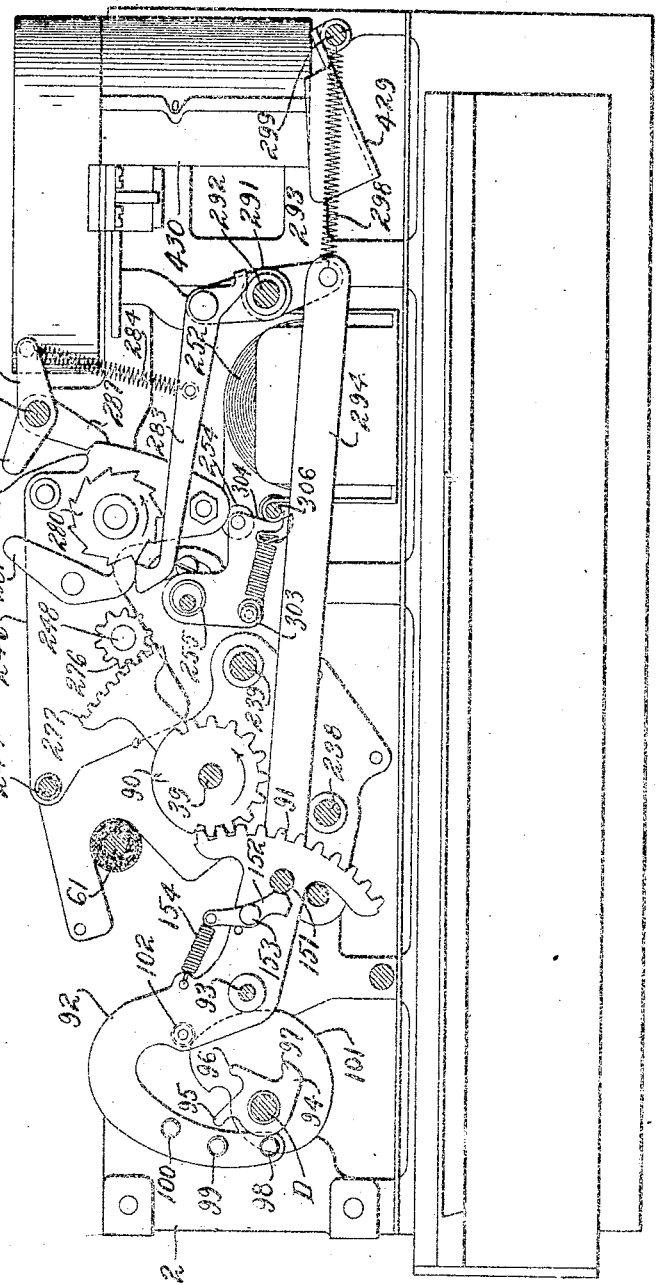

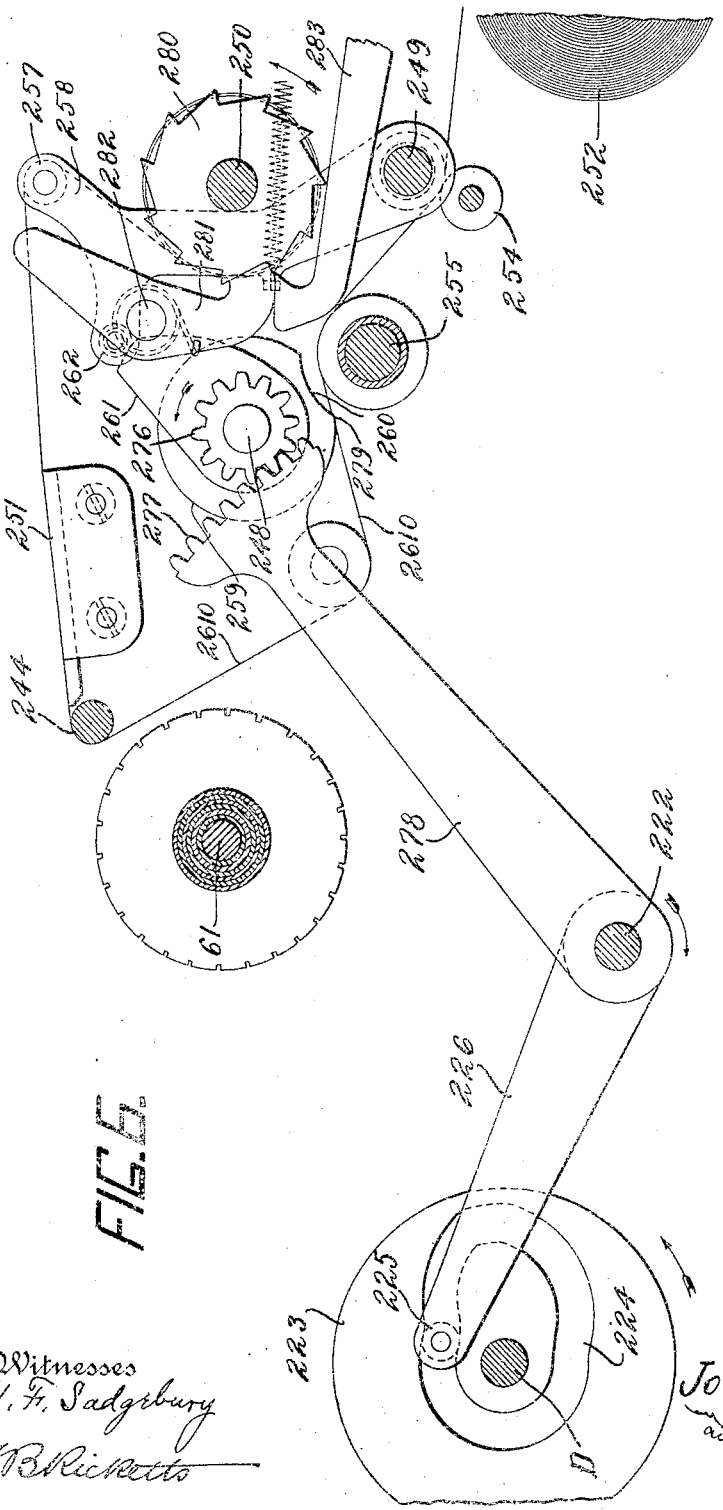

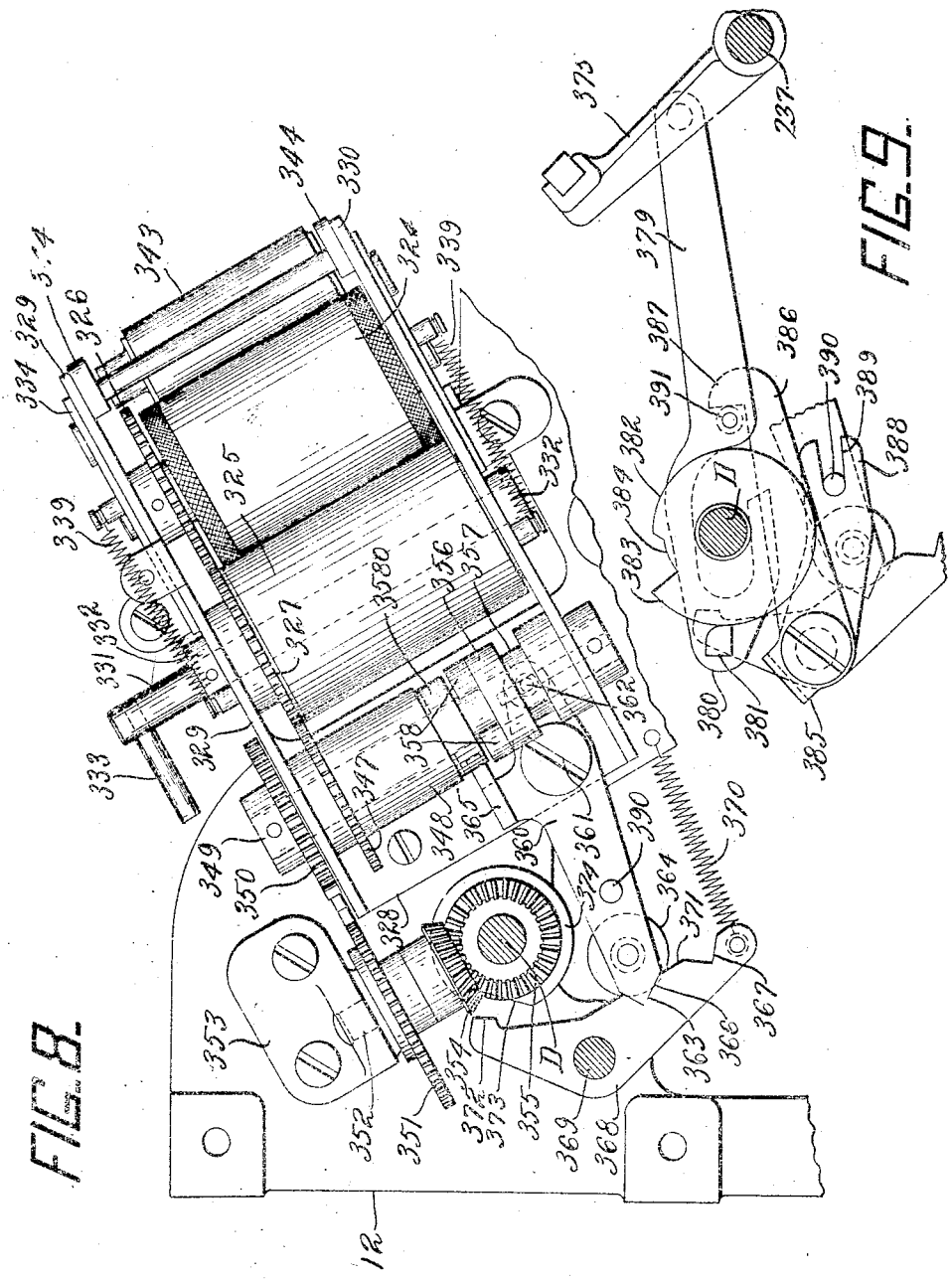

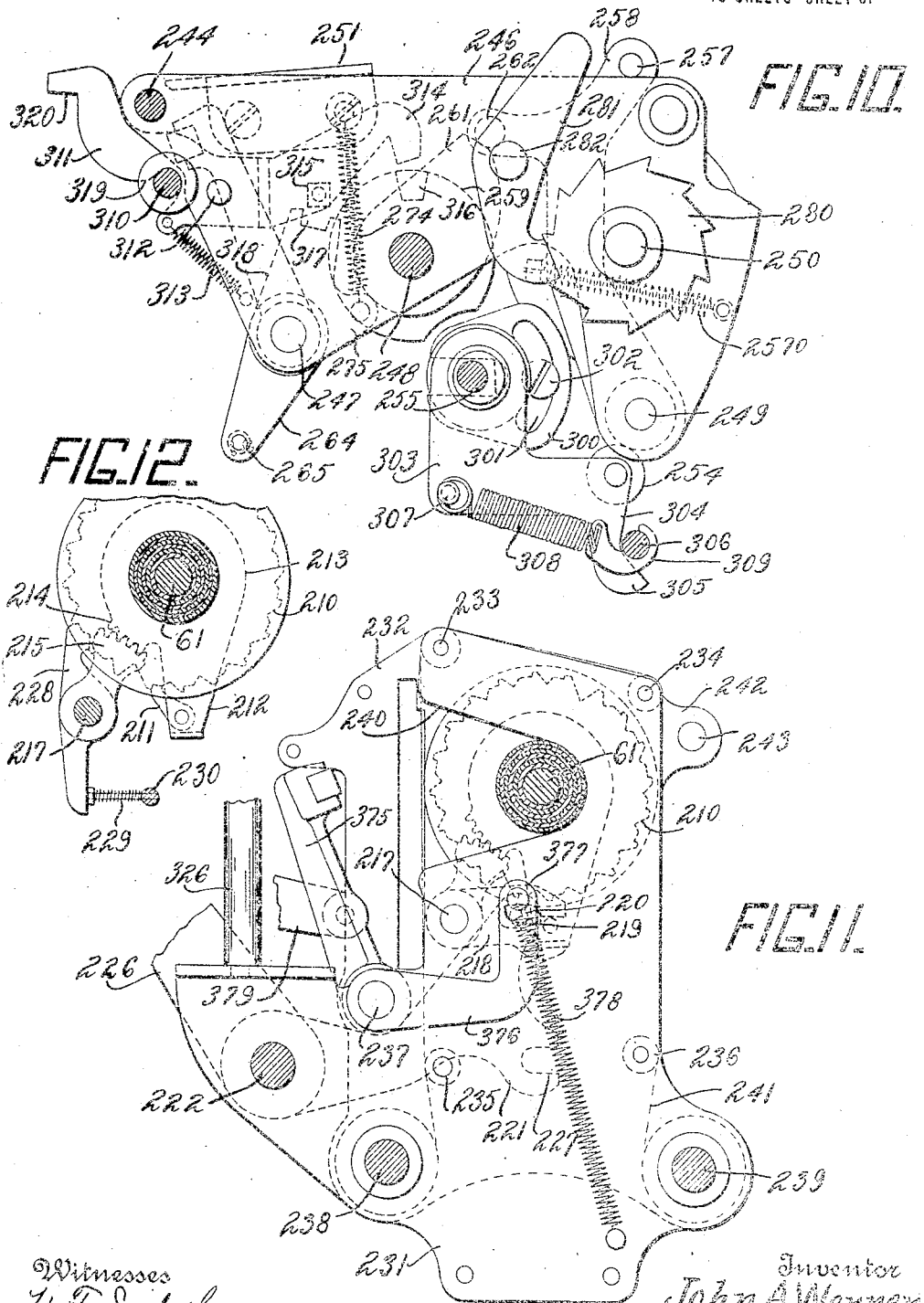

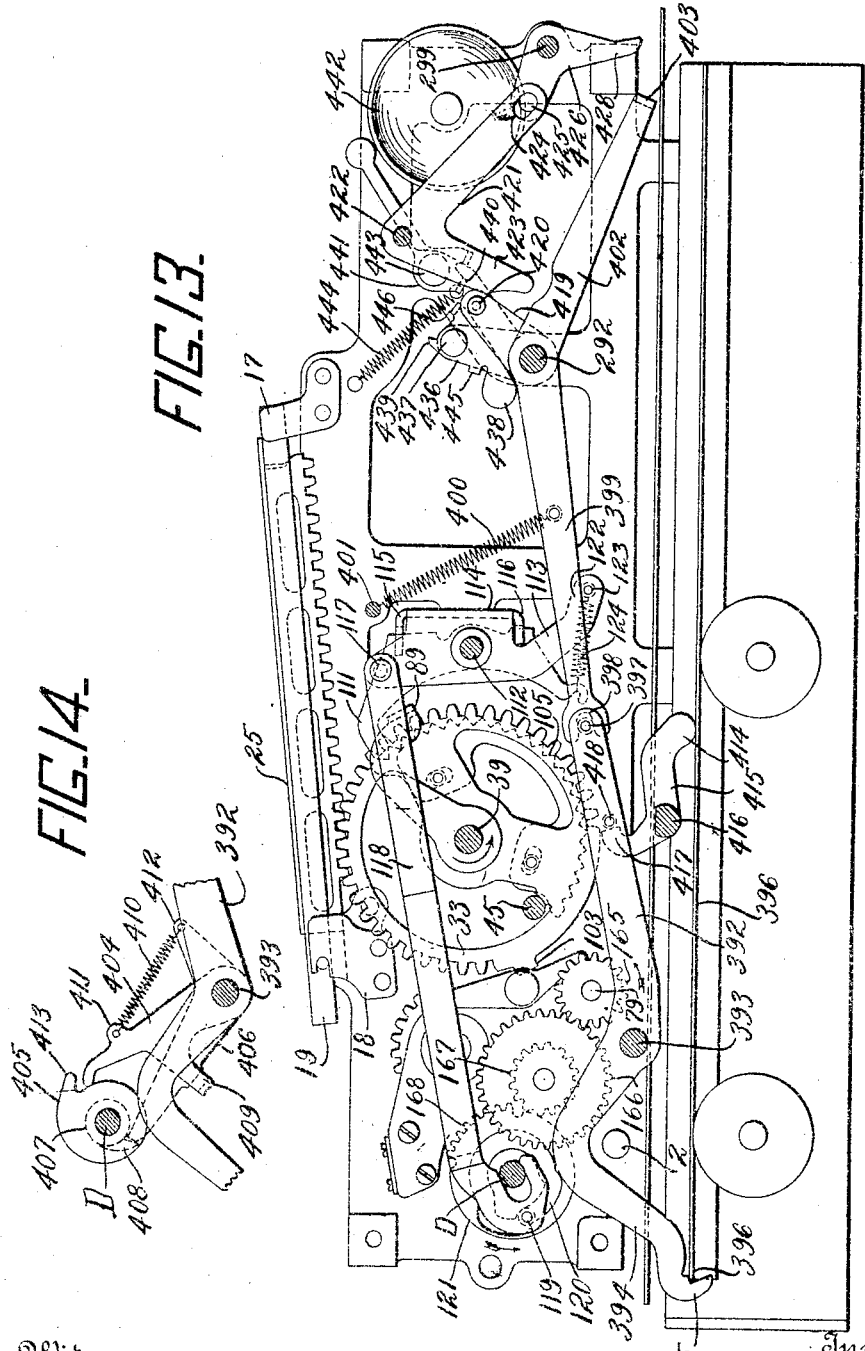

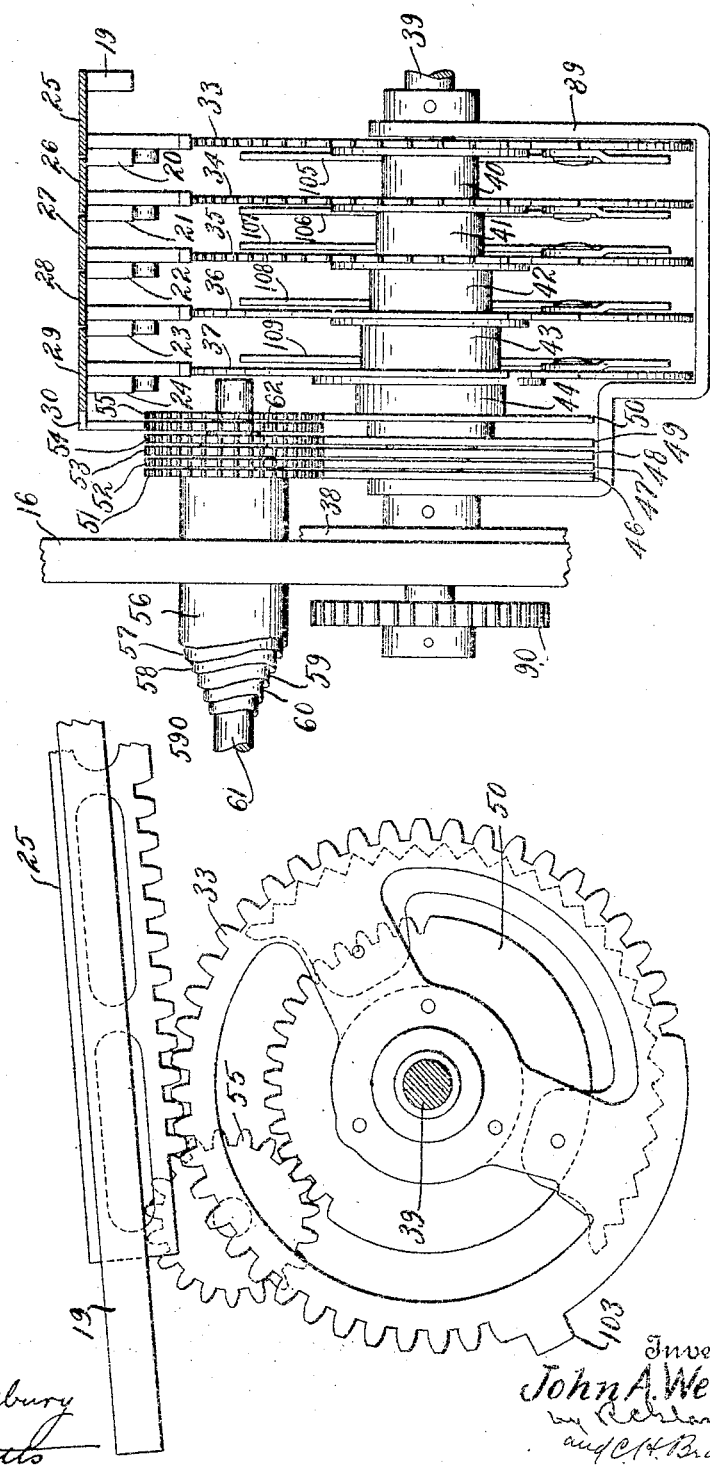

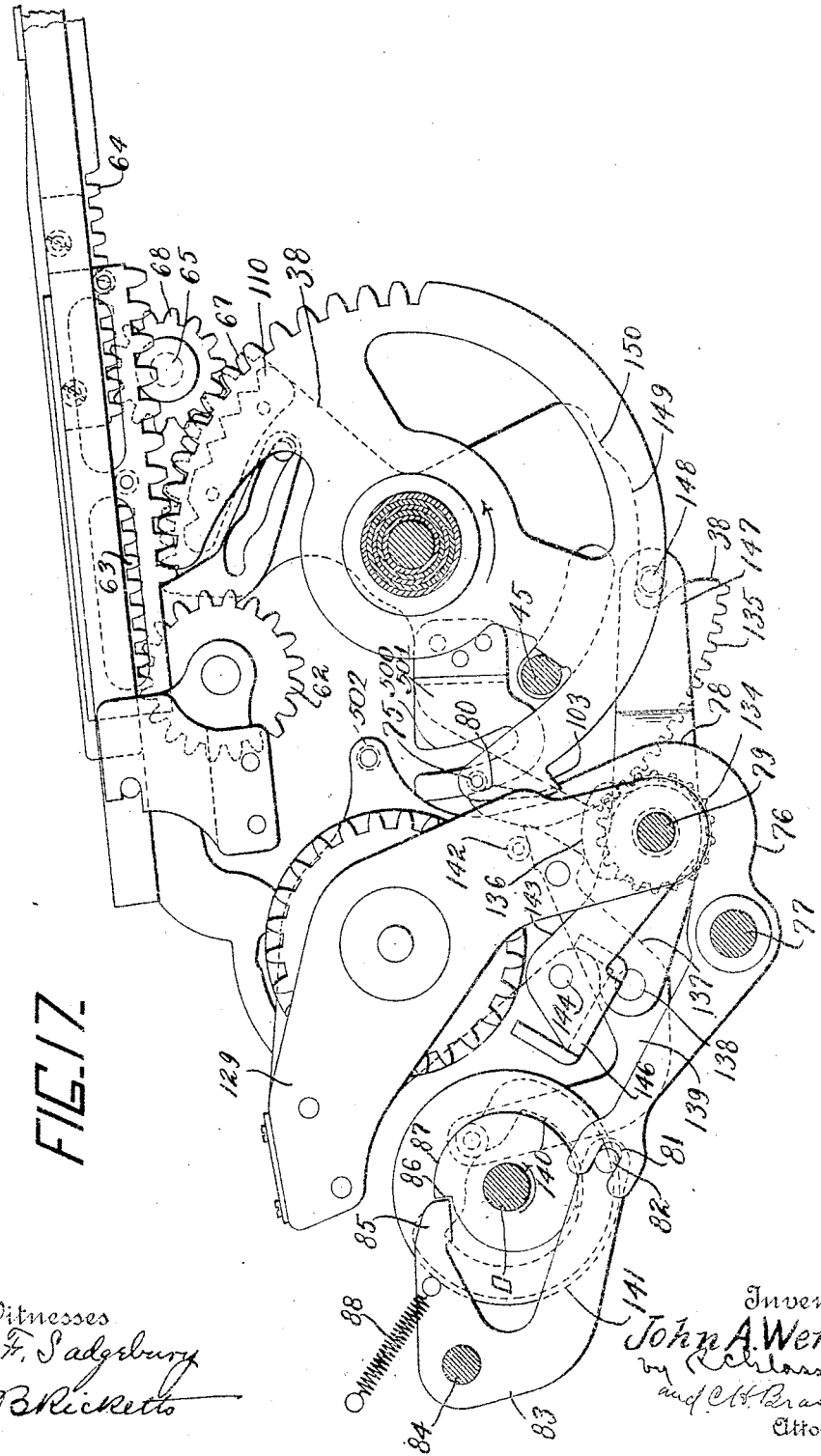

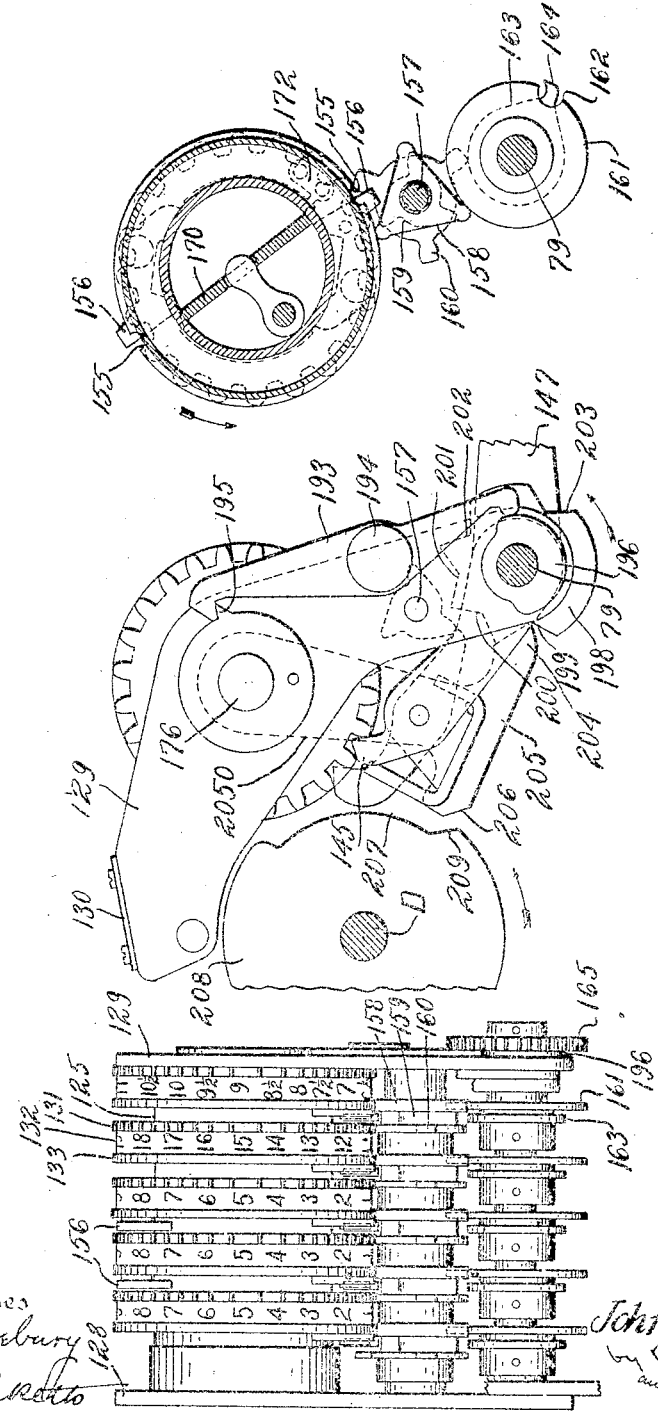

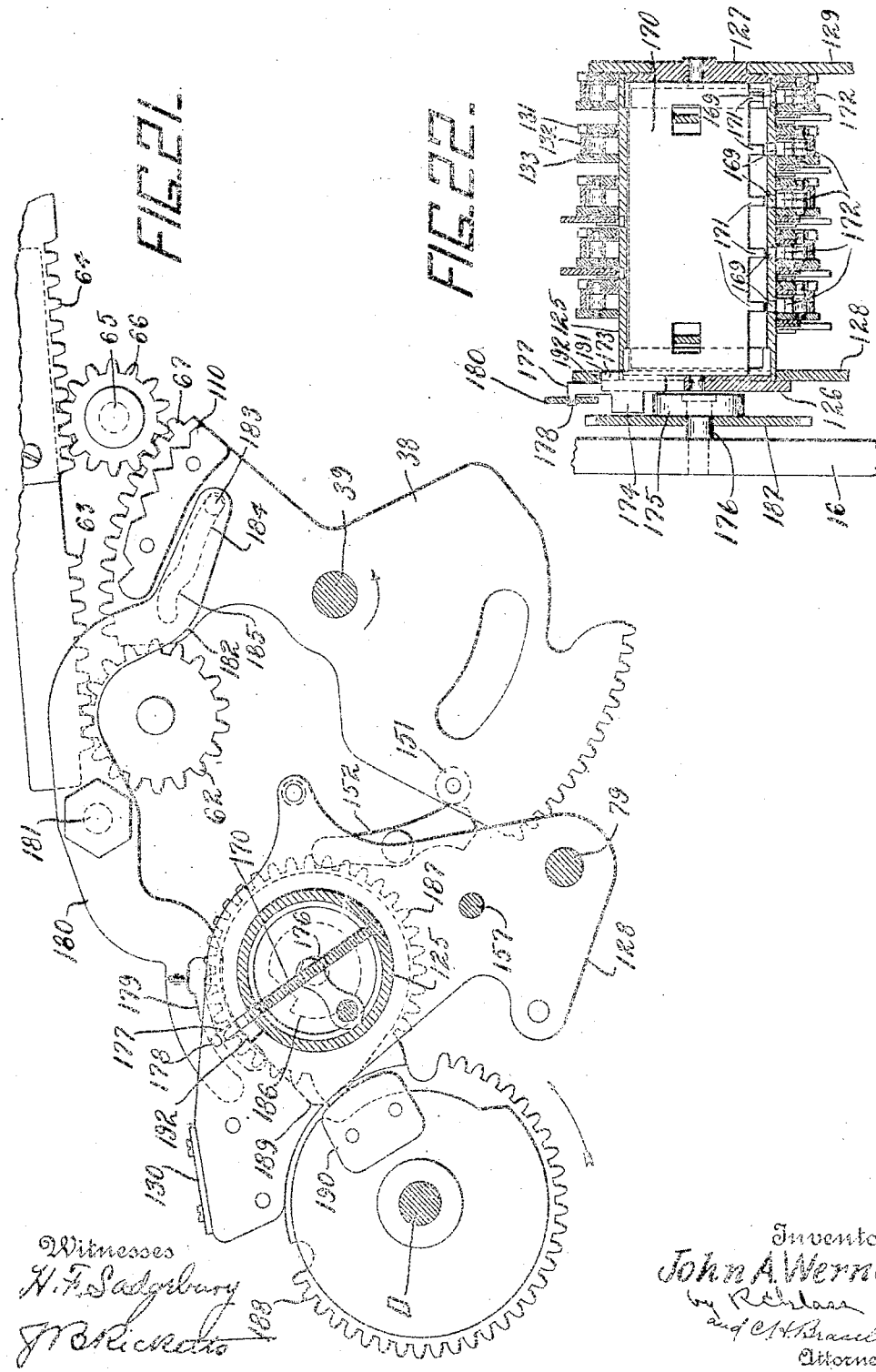

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,161,094.  Specification of Letters Patent.  Patented Nov. 23, 1915.

Application filed December 22, 1911. Serial No. 667,272.

*To all whom it may concern:*

Be it known that I, JOHN A. WERNER, a citizen of the United States, residing at Dayton, in the county of Montgomery and State of Ohio, have invented certain new and useful Improvements in Cash-Registers, of which I declare the following to be a full, clear, and exact description.

This invention relates to check issuing cash registers of the type having provision whereby the record strip may be written upon by the operator at each transaction.

It has for its general object to construct a machine of this class which will furnish increased advantages to users and in principle, design and construction be superior to past machines of this class.

More specifically its objects are to, provide means whereby in entering a transaction in the machine the record strip may be first written upon, then moved to a position in which the printing mechanism of the machine can print adjacent the writing, and after the printing is done moved back to its original position and beyond it one step, thus positioning the record strip for the next entry thereon. Movably mount the record strip carrying mechanism whereby it may be moved from normal position to a position in which a record strip may be more readily removed from or inserted in it. This is done by mounting the strip carrying mechanism upon a pivot about which it may be swung to obtain the desired movement. Means are provided whereby parts of this mechanism are locked from accidental movement when the mechanism is out of normal position. Provide means whereby the check issuing and printing mechanisms may be disabled or rendered operative as desired and by a common operation. Provide an improved form of counter with novel turn to zero mechanism therefor. The counter wheels are loosely mounted upon a hollow normally stationary drum which however is adapted to be coupled with the wheels and moved to return the latter to zero by an operation of the machine. Provide an improved restoring means for the actuating segments, actuated from the driving shaft of the machine by a series of projections and a cam, whereby the desired movement of the restoring mechanism may be effected. Provide an alining device for the actuating segments of improved form tending to normally yieldingly aline them but adapted to positively do so just previous to their engagement with the totalizer elements and to be positively disengaged from the segments during their restoring movement. Provide means whereby the actuation of the clerk's slide is necessary before the machine can be operated. Provide a control from the transaction slide over the meshing of the totalizer elements with the actuating segments therefor and also of the turn to zero operation of the machine. Provide improved drawer locking mechanism and connections whereby when the drawer is opened, the drawer locking mechanism operates to lock the bottom of the coin display in closed position, whereby coins therein can not drop therefrom when the drawer is open and out of position to receive them. And to accomplish the above objects in as positive a manner as is possible, avoiding all unnecessary use of springs and spring actuated devices.

With these and incidental objects in view the invention consists in certain novel features of constructions and combination of parts, the essential elements of which are set forth in appended claims and a preferred form of embodiment of which is hereinafter shown with reference to the drawings which accompany and form part of this specification.

Figure 2:
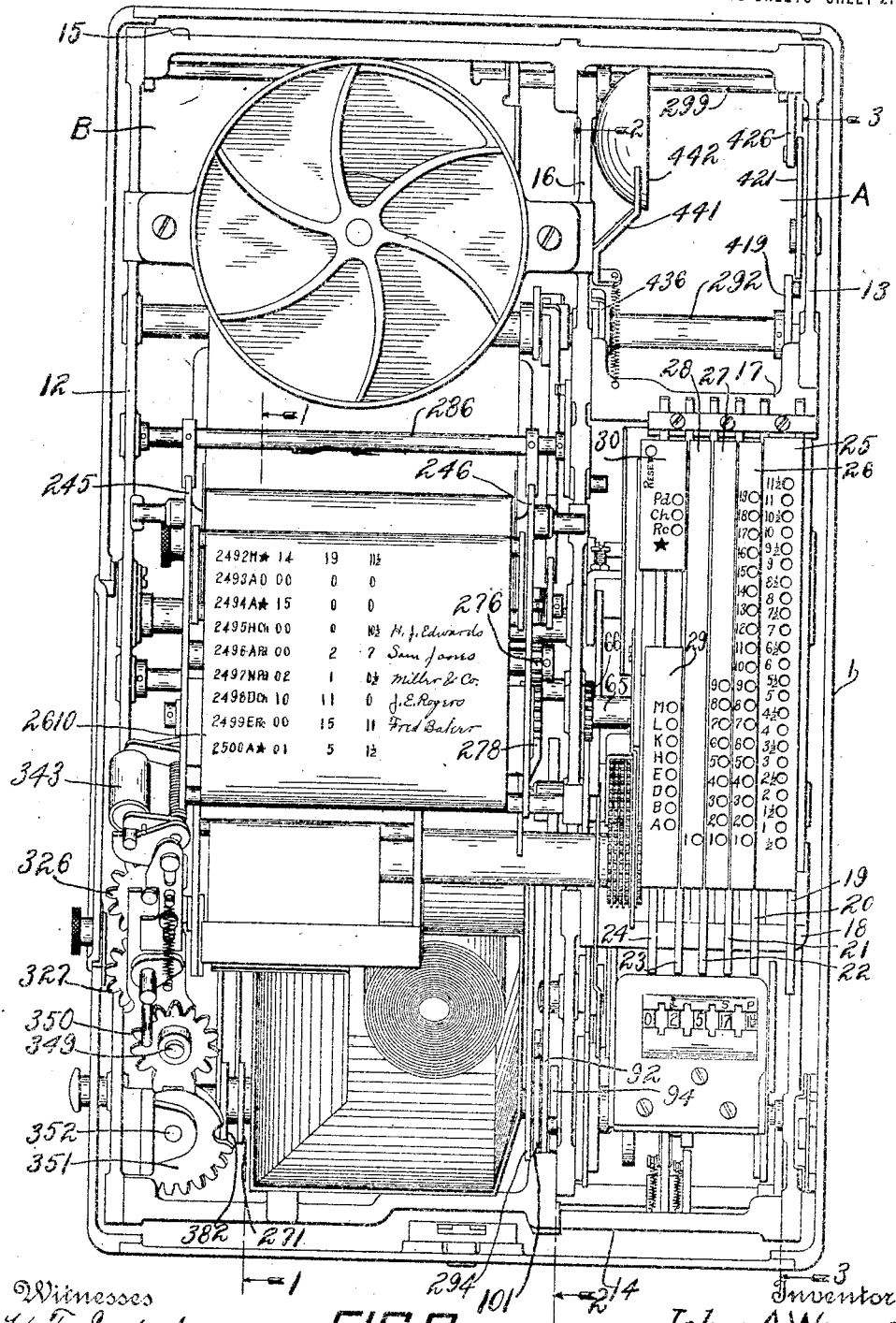
Figure 7:
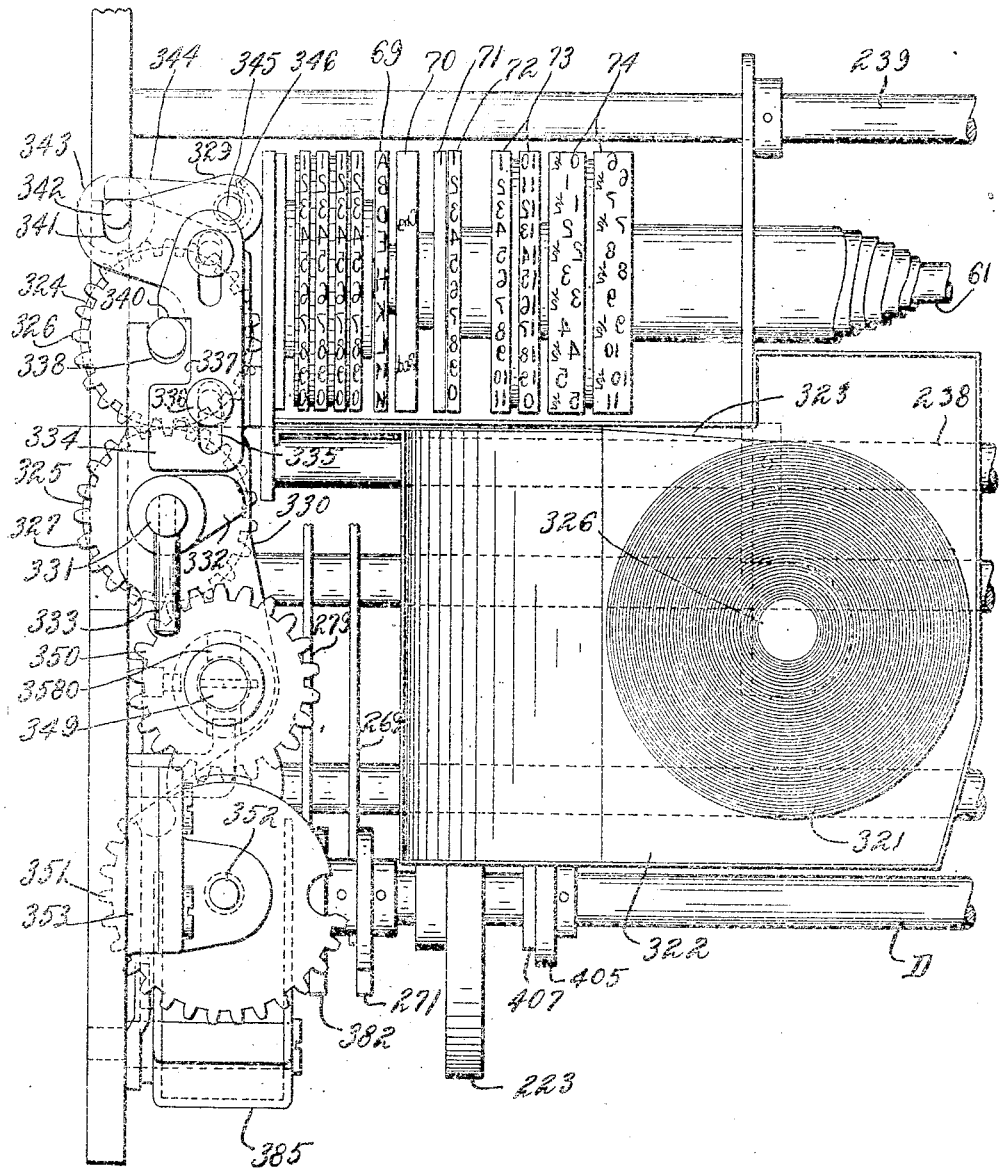

Figure 1 is a perspective view of the register assembled in its cabinet. Fig. 2 is a plan view of the register with the top of the cabinet removed. Fig. 3 is a vertical section taken on line 1—1, Fig. 2, with the coin display apparatus shown in elevation. Fig. 4 is a section on line 2—2, Fig. 2, looking in the direction of the arrows. Fig. 5 is a detail of mechanism not completely shown in Fig. 4. Fig. 6 is an enlarged view showing the detail strip feeding mechanism. Fig. 7 is an enlarged plan view of the check feeding mechanism and the type wheels. Fig. 8 is an elevation of the check feeding mechanism and electro looking in the direction of feed of the check strip. Fig. 9 shows a detail of the means for preventing the operation of the check printing hammer when no checks are to be issued. Fig. 10 is an elevation of the pivotally mounted detail strip carrying frame. Fig. 11 shows the consecutive numbering mechanism, the ink ribbon mounting, and the spring for actuating the check printing hammer. Fig. 12 is a detail view showing more clearly part of the consecutive numbering device of Fig. 11. Fig. 13 is a section on line 3—3, Fig. 2, just inside the frame. Fig. 14 shows a detail of the drawer and handle unlocking mechanism. Fig. 15 shows the differential elements and their connection with the sleeves of the type wheels. Fig. 16 is a view of part of the construction of Fig. 15, but as it appears at right angles. Fig. 17 shows the clerk's initial and transaction slides and their connections, whereby the former controls the machine lock and the latter the throwing in and out of the counter. Fig. 18 shows the construction of the transfer mechanism. Fig. 19 shows the locking mechanism for the totalizer drum and the locking pawls for the wheels thereon. Fig. 20 is a front view of the counter and transfer devices. Fig. 21 shows a part of the turn to zero mechanism including the means for coupling the totalizer drum with the totalizer wheels thereon by the movement of the transaction slide. Fig. 22 is a longitudinal section through the counter and its supporting mechanism.

Objects attained by this invention are the recording upon a detail strip of the amount, kind, and consecutive number of each transaction and the initial of the clerk making it. Similar printing operations are also performed upon a check strip, which may be fed from the machine at each operation. A counter is also provided for accumulating the total of the amounts of transactions in which money is received.

For convenience in description, the machine may be considered as comprising primarily a differential mechanism whereby the type wheels are differentially set to print, not only the amount of each transaction, but also the initial of the clerk making it, and the kind of transaction; a counter and turn to zero devices therefor, in which the total of amounts received are accumulated; a detail strip printing and feeding mechanism; a check printing and feeding mechanism; and a drawer locking mechanism taken in connection with the coin display mechanism. The differential mechanism also controls the throwing in of the counter for proper transactions and operations and its differential actuation, as well as also the unlocking of the machine.

The general relationship of the above mentioned mechanisms to each other is shown in Figs. 1 and 2, from which figures the mechanism of the machine will be seen to be mounted in the main within a cabinet 1. Projecting from the machine proper through the cabinet on one side is a shaft 2 supporting the handle 3 from which the operating mechanism of the machine is driven. The top of the cabinet is provided with a pivotally mounted lid 4 covering the forward portion of the top. This lid is provided with an oblong opening 5 through which the differential elements of the machine may be manipulated. A portion of this lid shown at 6 is of glass, through which the detail strip may be observed. One corner of this glass is removed at 7 to permit the operator writing upon a portion of the detail strip which passes beneath this glass. A portion of the rear unhinged part of the top of the cabinet is also of glass through which, as shown at 8 in Fig. 1, may be seen coin display mechanism. An opening 9 is formed adjacent this glass leading to the coin display mechanism through which coins are inserted in said mechanisms.

10 is a removable portion of the lid 4 of the cabinet which may be removed to inspect parts of the mechanism of the machine.

11 represents the front of the cash drawer mounted in the lower portion of the machine. Practically all of the mechanism of the machine is however invisible when the cabinet is closed.

The different parts of the mechanism are mounted in or supported either directly or indirectly by the main frame of the machine which is of oblong shape and comprising side portions 12 ad 13 and end portions 14 and 15. The interior of this frame is divided by a partition 16 connected to the ends 14 and 15 of the frame which serves to support many parts of the mechanism and to form end bearings for some of the shorter shafts which do not extend the entire width of the machine. This partition is not solid but open in places through which openings in some instances parts of the mechanism are caused to move. It is located nearer side 13 of the main frame than side 12 forming compartments A and B within the frame which are respectively adjacent sides 13 and 12.

*Differential mechanism.*—Being the first to be operated when the machine is operated, the differential mechanism will be the first described in detail. This mechanism comprises amount differential mechanism, clerk's initial differential mechanism, and transaction differential mechanism. Each of these differential mechanisms control the position of corresponding printing type, while the amount differential mechanism also controls the differential actuation of the counter. The clerk's initial differential mechanism also controls the unlocking of the machine. The transaction differential mechanism controls the meshing of the counter with the amount differential mechanism when amounts are to be entered in the counter and also the operation of the machine to turn the counter to zero.

Referring to Figs. 2 and 13 of the drawings, these mechanisms will be seen to be located between the partition 16 and the right side 13 of the frame in the compartment above termed A. Rigidly supported by the right side 13 of the frame and the partition 16 and projecting across compartment A are a pair of supports 17 and 18 (Figs. 2 and 13). These supports carry a series of longitudinal parallel bars 19, 20, 21, 22, 23 and 24, which extend from the back support 17 to slightly in front of the forward one 18. As shown in Figs. 2, 13 and 15, a series of slides 25, 26, 27, 28, 29 and 30 are supported by bars 19 to 24 so as to be capable of longitudinal sliding movement thereon. These slides 25 to 30 are provided with longitudinally depending portions provided with rack teeth. The depending portions of slides 25 to 29 project between and below their respective parallel supporting bars while the depending portion of slide 30 is at the left of all of these bars, this slide proper being a short one mounted in alinement with, and at the rear of slide 29 which is also shorter than slides 25 to 28. Slides 25, 26, 27 and 28 are a part of the amount differential mechanism, slide 29 of the clerk's initial differential mechanism and slide 30 of the transaction differential mechanism.

The machine is adapted for handling money in the English denomination and accordingly beginning with the slide at the right in Figs. 2 and 15, the first slide 25 may be termed the "pence" slide, the second 26 the "shilling" slide, the third 27, the "pound" slide and the fourth 20, the "tens of pounds" slide. The pence slide 25, as shown in Fig. 2, is provided with twenty three longitudinally arranged holes and with characters for each differing by one half, beginning at ½ and ending at 11½. The shilling slide 26 is provided with nineteen holes numbered from 1 to 19, respectively. The third or pounds slide is provided with nine holes numbered consecutively from one to nine and the fourth or tens of pounds slide is provided with but one hole, numbered 1, as the machine is not designed to handle transactions in amounts as high as twenty pounds. The fifth slide 29 or the clerk's initial slide is shown in the drawings as provided with eight holes which have each a clerk's initial adjacent and corresponding thereto. Extending across the front end of opening 5 in lid 4 of the cabinet and over the forward end of these slides is a plate 31, shown in Fig. 1. By the insertion of a pin in either of the holes in the various slides they may be moved forward to extents corresponding to the normal distance of the particular hole in which the pin was inserted from the plate 31. The pin and slide moving together forwardly will be limited in their movement by the engagement of the pin against the rear edge of this plate 31.

As stated above, the fifth slide 29 is a short one and, as shown in Fig. 2, is only of about one half the length of the other slides above mentioned. Short transaction slide 30 is mounted at the rear of and in longitudinal alinement with the clerk's initial slide. This is provided, as shown, with three holes adjacent the foremost of which appears the character Re., the second, Ch. and the third, Pd. Below the foremost of these characters, Re. appears a star with no hole corresponding thereto. This slide is supported by the same longitudinal bars 23 and 24 that support the clerk's initial slide but rest upon these near their rear end. A fourth hole some distance from the others appears in slide 30 designated in Fig. 2 by the word "Reset." By inserting the operating pin in either of the four holes in this transaction slide 30 it may be moved toward the front until the operating pin strikes fixed plate 32 also carried by lid 4 of the cabinet, thus positioning the slide the desired amount. The movement of the amount slides 25, 26, 27 and 28, clerk's initial slide 29 and transaction slide 30 is used to respectively differentially position amount actuators 33, 34, 35 and 36, clerk's initial segment 37 and transaction segment 38. These actuators and segments are mounted to rotate about a shaft 39 mounted in a bearing in the right side 13 of the frame and in a bearing in the partition 16. The amount actuators 33 to 36 and clerk's initial segment 37 are respectively rigidly mounted on the right hand end of sleeves 40, 41, 42, 43 and 44 one for each actuator which are loosely and concentrically nested upon shaft 39 for independent rotation thereon. Sleeve 40 is of smallest diameter and immediately surrounds shaft 39 and as stated carries actuator 33 having gear teeth meshing directly with rack teeth on the depending portion of the pence slide 25. The shilling slide 26 similarly operates in connection with actuator 34 carried by sleeve 41 immediately surrounding sleeve 40. Units pound slide 27 is similarly operatively connected with actuator 35 of sleeve 42 of next larger diameter and the tens of pound slide 28 likewise connected with actuator 36 of sleeve 43 of next larger diameter. Sleeve 44 of still larger diameter in the same way supports actuator 37 for the clerk's initial slide. Differential movement of slides 25 to 29 will accordingly position the corresponding actuators 33 to 36 or segment 37 differentially about their axis 39. The zero or normal position of actuators 33 to 36 and segment 37, shown in Figs. 13, 16, 17 and 21, in which position they are positively stopped when being restored to normal position after having been differentially adjusted by the slides, by bar 45 extending through openings in the actuators and segment and mounted in the right side 13 and portion 16 of the frame. The movement of these actuators and segments when being positioned by their corresponding slides will be in the direction of the arrows in these figures while their restoring movement will, of course, be in the reverse direction. The differential positioning of the amount actuators 33 to 36 serves to set up type wheels, and their restoration to normal position to differentially actuate the counter wheels, in case the latter have been operatively connected with the actuators, to extents corresponding to the extent of their restoring movement, as hereinafter described. The segment 37 for the clerk's initial slide 29 has no effect upon the counter but, in addition to setting up printing type to print the corresponding clerk's initial, serves to unlock the machine for operation. The printing takes place just after the differential setting of these elements and the resultant setting of the printing type and before their restoration to normal position.

The differential positioning of amount actuators 33, 34, 35 and 36 and clerk's initial segment 37 serves to position type carriers common to the check and detail strip printing mechanism and to set up type for both of these mechanisms. To this end the concentrically nested sleeves 40, 41, 42, 43 and 44 carry at their ends opposite those on which the actuators are supported, respectively, disks 46, 47, 48, 49 and 50, each provided with gear teeth on a portion of its periphery. Through these gear teeth these disks 46, 47, 48, 49 and 50 respectively operatively connect with pinions 51, 52, 53, 54 and 55 carried respectively by nested sleeves 56, 57, 58 and 59 and 590 carried by shaft 61 with which the sleeves are concentric. Between sleeve 590 and sleeve 59 carrying pinion 54 is mounted a sleeve 60 carrying pinion 62 which is located between pinions 54 and 55. This pinion 62 is actuated directly from transaction slide 30 which has a depending portion which projects forwardly along the left side (Figs. 2 and 15) of clerk's initial slide 29 and carries on its under side two sets of rack teeth 63 and 64 (Figs. 17 and 21). Rack teeth 63 mesh directly with the teeth of pinion 62 and serve to impart any differential movement of slide 30 to sleeve 60 carrying pinion 62. Rack teeth 64 serve to impart differential movement of slide 30 to transaction segment 38 mounted on shaft 39 adjacent partition 16 of the frame. This is imparted through a stub shaft 65 mounted in partition 16 carrying a pinion 66 adjacent to this partition meshing with gear teeth 67 on the transaction segment 38 and a second pinion 68 mounted on the end of the stub shaft, beneath and meshing with rack teeth 64 on transaction slide 30. In this way differential movement of transaction slide 30 is communicated to transaction segment 38 in a direction reverse to the arrow in Fig. 17 and in the direction of the arrow in Fig. 21, the purpose for which will hereinafter appear.

Shaft 61 passes through the nested sleeves 56, 57, 58, 59 and 60, the outer one of which is journaled in partition 16 of the frame and terminates in a bearing in the left side 12 of the machine frame. This shaft supports the left ends of these sleeves and the type carriers which they carry. It also loosely supports the consecutive number type carriers which are the four type wheels at the left in Fig. 7, the operation of which will later be described. Sleeve 590 on this shaft rigidly carries a type carrier 69 which carries two sets of oppositely arranged clerk's initial type, one set for the detail strip printing mechanism at the rear and the other set at the front for the check printing mechanism. Sleeve 60 immediately surrounding sleeve 590 supports a type carrier 70 similarly carrying two sets of transaction characters, a star of each set being normally in printing position which is used to indicate cash transactions. Besides the "star" for cash transactions, each set includes characters Rc. Ch. and Pd. indicating respectively "received on account," "charge," and "paid out" transactions. Sleeve 59 carries a type carrier 71 carrying at its front and back a single character 1. This type carrier is for the tens of pounds slide and it will be remembered that the machine is not designed to handle amounts as high as twenty pounds. Type carrier 72 is carried by sleeve 58 and is provided with a front and back set of 1 to 9 characters for the units of pounds slide. Sleeve 57 carries a type carrier 73 for the shilling slide and sleeve 56 carries adjacent to type carrier 73 a type carrier 74 for the pence slide. As twenty characters from 0 to 19 are necessary for the shilling type carrier 73 and as twenty-four are desirable for the pence carrier, each set of these characters are arranged completely around the type carriers making necessary two rows of characters for each of these type carriers, one for printing upon the detail strip and one upon the check strip. The printing hammers for the detail strip and the check strip are each cut away adjacent the type of the shilling and pence wheels with which they do not coöperate.

The operation of the mechanism of the machine so far described is effected completely by the adjustment of differential slides 25 to 30. Amount slides 25, 26, 27 and 28 directly position amount actuators 33, 34, 35 and 36 which are respectively connected, as above described, with sleeves 56, 57, 58 and 59 carrying amount printing type carriers 74, 73, 72 and 71. Clerk's initial slide directly positions clerk's initial segment 37 which is connected with sleeve 590 on shaft 61 carrying clerk's initial carrier 69 and transaction slide 30 directly actuates sleeve 60 carrying transaction type carrier 70.

*Unlocking of machine by movement of clerk's initial slide.*—In addition to setting up the clerk's initial type carrier, the movement of clerk's initial segment 37 through slide 29 serves to unlock the machine for operation. To this end, as shown in Fig. 17, this segment carries a pin 75 projecting from its side into the plane of the rear end of lever 76 loosely pivoted on shaft 77 supported in the lower portion of partition 16 and side piece 13 of the frame. Rear end 78 of this lever is curved upwardly around shaft 79 and at its extreme end 80 is adapted to be engaged by pin 75 on segment 37 when this segment is in normal position. The forward end of lever 76 is notched at 81 which notch engages over pin 82 carried by one arm of bell crank locking member 83 mounted on a shaft 84 supported in partition 16 and side 13 of the frame. The other arm 85 of this locking member is adapted to engage projection 86 on disk 87 rigid with drive shaft D of the machine. A spring 88 is connected at one end to a fixed part of the machine and at the other to arm 85 of locking member 83 tending at all times to retain and permit rotation of the drive shaft D. This effect of spring 88 is not permitted when the machine is in normal position, because of the engagement at such time of pin 75 on segment 37 with end 80 of lever 76 holding the rear end of lever 76 upwardly and the forward notched end downwardly which, through the connection with locking member 83, holds the latter in locking engagement with disk 87 and prevents rotation of drive shaft D. When segment 37 is moved by its clerk's initial slide 29, pin 75 is withdrawn from end 80 of lever 76 and allows spring 88 to withdraw upper arm 85 of locking member 83 out of the path of lug 86 on disk 87 and permit rotation of the drive shaft in the direction of the arrow in Fig. 17. By this mechanism actuation of the clerk's initial slide is made necessary before the machine can be operated.

*Restoring mechanism for amount actuators and clerk's initial segment.*—After the printing operations have been performed in a manner hereinafter described, the amount actuators 33 to 36, as well as clerk's initial segment 37, are returned to normal position before which return in certain transactions the counter wheels are thrown into mesh with actuators 33 to 36 with the result of the counter being additively actuated by the return of these actuators to zero to extents controlled by the extents which the actuators had been moved from their normal position by the actuation of the amount slides 25 to 29. This restoration of the differentially set actuators 33 to 36 and segment 37 to normal position is accomplished by the following mechanism.

As shown in Figs. 13 and 15, a yoke 89 is rigidly mounted on shaft 39 and extends over the actuators 33 to 36, segment 37 and disks 46 to 50. The transaction segment is without this yoke, however, as shown in Fig. 15, as it is restored by other mechanism. This shaft 39 projects through the partition 16 and, within the compartment B before defined, supports a segment gear 90 which meshes with teeth 91 on the rear edge of lever 92 pivotally mounted on pin 93 projecting from partition 16 within the compartment B as shown in Fig. 4. The end of lever 92 opposite that meshing with segmental gear 90 is of goose neck form and extends over the main driving shaft D of the machine adjacent an actuating member 94 secured to this shaft which is provided with three fingers 95, 96 and 97 adapted to engage, respectively, when the drive shaft is rotated in the direction of the arrow in this figure, with three pins 98, 99 and 100 carried by the goose neck. Rotation of the main shaft D causes finger 95 to engage over pin 98 and pull the goose neck down to a certain extent. Just before this finger 95 recedes from pin 98, finger 96 enters into driving engagement with pin 99 and the goose neck is drawn farther downward. Previous to the disengagement of these elements, finger 97 engages over pin 100 and further moves the goose neck end of lever 92 in a downward direction. Adjacent the actuating member 94 on the driving shaft is a cam 101 adapted to engage with roller 102 on the goose neck. This cam is so shaped as to permit the pulling down of the goose neck by the actuating member 94, as just explained, and is also designed to force the goose neck upwardly to normal position after all the fingers 95, 96 and 97 have become disengaged from their corresponding pins. The pulling down of the goose neck by means of the fingers on the actuating member and the pins on the goose neck, of course has the effect of raising the other end of the lever which carries teeth 91 meshing with segmental gear 90 mounted on shaft 39 and will oscillate this shaft in a direction reverse to the arrow in Figs. 4 and 13. The reverse direction of the movement of these parts will occur when the goose neck end of the lever 92 is lifted later by the cam 101 engaging with roller 102 of the goose neck. The position of these parts shown in Figs. 4 and 13 is their normal position. The yoke 89, which as stated above, is rigidly connected with shaft 39, is shown in dotted lines in Fig. 13. Upon the drawing down of the goose neck end of lever 92 segmental gear 90 will be rotated in a clockwise direction, as shown in Fig. 4, as will also shaft 39 and yoke 89 carried thereby as shown in Fig. 13.

Actuators 33 to 36 and segment 37 carry projections 103 which in the normal position of the machine will be located, as shown in Figs. 13, 16 and 17, but as these actuators are differentially set by their actuating slides, these projections will be moved in a counter-clockwise direction in these figures to more or less extents. The effect of the pulling down of the goose neck end of lever 92 then is to swing yoke 89 about its axis from its normal position shown in dotted lines in Fig. 13 in a clockwise direction in this figure and cause it to engage all of these lugs 103 on the different actuators and return the latter to their normal position which is shown in Fig. 13. After this is done the restoring yoke is swung back to normal position by the cam 101 acting on roller 102 on lever 92. When the actuators are restored to normal position, the supporting webs of each engage rod 45 above referred to, projecting through openings in the actuators which limits the movement of these actuators in the restoring direction.

*Alining mechanism for the amount, clerk's and transaction segments.*—Provision is made for alining and preventing accidental movement of the amount actuators and the clerk and transaction segments. To this end the amount actuators 33 and 36 as well as the clerk's initial segment 37, and transaction segment 38 have respectively bolted to their sides peripherally notched alining plates 105, 106, 107, 108, 109 and 110, each of which is adapted to be engaged respectively by the corresponding one of a number of alining pawls 111 loosely mounted on a shaft 112 supported at its ends in the partition 16 and right side 13 of the machine frame. This shaft 112 also carries a pawl frame comprising end plates 113 through which shaft 112 extends, and a back connecting portion 114 for the end plates which is bent forwardly at its top and bottom at 115 and 116 respectively. These forwardly bent portions are each provided with a series of notches in which the upper and lower portions of the pawls play. The upper portion of each pawl plays in a notch in the upper forwardly bent portion and the lower portion of it plays in the corresponding one of the lower series of notches. In this way the pawls are held from relative displacement longitudinally of the shaft 112 and may be positively forced into or out of engagement with the alining plates. The upper portion of one of the end plates 113 of this frame is pivotally connected at 117 with one end of a link 118 the other end of which is hooked shape and extends forwardly over and partly around the driving shaft D. This hooked end carries a pin 119 working in a cam groove 120 in cam 121 rigidly mounted on the driving shaft.

The end portions 113 of the pawl frame each have a depending portion 122 which support and between which extends a rod 123. A series of springs 124, one for each pawl, connect the lower end of each pawl yieldingly with this rod 123 and tend at all times to cause the lower portions of these pawls to rest against the back of the series of notches in the lower forwardly bent portion 116 of the pawl frame. The normal position of these parts is as shown in Fig. 13 in which link 118 and the pawl frame are in intermediate position, the pin 119 on the former being located in an intermediate portion of the cam groove 120. When in this position springs 124 tend to hold the retaining pawls 111 in engagement with their respective alining plates 105 to 110 on the actuators, but these pawls being yieldingly held in engagement with these plates by these springs 124 and as the end of the retaining pawls are beveled, they may yield so as to allow the actuators and the segments to be adjusted by the movement of the differential slides. This adjustment is effected before the drive shaft D starts to rotate. In rotating, this drive shaft moves in the direction of the arrow in Fig. 13 and the effect of its first movement is, due to the shape of the cam groove 120 in cam 121, to compel link 118 and the upper end of the pawl frame to move positively forwardly into a position in which the back of the upper series of notches in the pawl frame engage against the rear side of the upper portions of pawls 111 and hold them positively in engagement with the notches in the alining plates of the actuators. The actuators are positively held in this position while the printing operations take place. As the driving shaft continues to rotate, however, the cam groove 120 will cause the rearward movement of link 118 and the upper part of the pawl frame and the resultant forward movement of the lower part of this frame. The movement in this direction carries these members beyond their normal position, as shown in Fig. 13, and to a position in which the rear of the lower set of notches in the pawl frame engage positively the lower ends of pawls 11 and causes their movement about their axis 112 in a clockwise direction in this figure and their disengagement from the alining plates completely. This position of these parts is retained for a comparatively considerable length of time during which the actuators are moved by the restoring yoke 89, as previously described, to normal position. After the actuators are restored, cam groove 12 causes the movement of link 118 and the pawl frame to normal or intermediate position in which the pawls 111 will be yieldingly held by the springs 124 in engagement with the notches in the alining plates of the actuators and the restoring yokes are then returned to their normal position, as shown in Fig. 13 in dotted lines.

*Counter.*—The machine is provided with a single totalizer in which is adapted to be entered only amounts received. The machine, however, is adapted to print upon the record strip and check, four different kinds of transactions, "cash", "received on account", "charge" and "paid out". The actuation of the counter elements in the adding operation is accomplished upon the restoring movement of the amount actuating segments 33 to 36. The counter is normally out of engagement with these segments but is adapted, upon the operation of the machine when "received on account" or "cash" transactions are recorded, to be thrown into mesh with the amount actuating segments after they have been differentially set but before their restoring movement. The restoration of these segments by the yoke 89 then effects the differential and proper actuation of the counter elements. When "charge" and "paid out" transactions are entered in the machine, provision is made whereby the counter remains out of engagement with the actuating racks throughout the operation, with the result that amounts of these transactions are not entered in the counter.

As shown in Figs. 20 and 22, there are five counter wheels which are adapted for handling transactions in the English monetary system. The first wheel at the right in Fig. 20 represents pence, the second, shillings, and the three remaining wheels, pounds. The pounds wheel at the extreme left is not directly actuated by an actuating segment but is useful only in receiving transfers from the tens of pounds wheel adjacent to it on the right. These wheels are loosely mounted upon a drum 125 carrying heads 126 and 127 which are respectively rotatively supported in the two end members 128 and 129 of the counter supporting frame. These end members of the counter frame are connected at their upper forward corner by a transverse plate 130. This counter supporting frame is supported upon shaft 79 around which it is adapted to be rocked to throw the counter into and out of engagement with the actuating segments. The counter wheels are loosely mounted on drum 125 and each is composed of three main parts, a gear 131, a drum 132 and a disk 133. These members are bolted together, however, and are in effect one member. Shaft 79 which supports the counter frame is mounted at its ends in partition 16 and the right side 13 of the frame. Shaft 79 also carries adjacent the partition 16 of the frame of the machine a gear 134 meshing with gear teeth 135 upon transaction segment 38 shown in Fig. 17. This transaction segment, as stated above, is differentially rotated by means of pinions 66 and 68 on stub shaft 65 and transaction slide 30. Gear 134 is provided with an arcuate projection 136. The side frame of the counter adjacent the partition 16 is provided with a forwardly projecting portion 137 to which at 138 is pivotally connected intermediate its ends a lever 139, one end of which operates in a cam groove 140 in cam 141 attached to the drive shaft D of the machine and the other end of which lever 139 is adapted to normally rest upon the arcuate projection 136 upon gear 134. A pin 142 projects from end plate 128 of the counter frame over the rear end of lever 139 and limits the upward movement of the rear end of this lever. When the machine is operated with the rear end of lever 139 resting on arcuate lug 136, the lever 139 is swung about this lug 136 as a fulcrum by cam 141 with the result of rocking the counter frame upwardly and rearwardly (Fig. 17). This rocking movement takes place after the actuating segments have been positioned differentially, but before their restoration to normal position. The frame remains in the position into which it has been rocked with the counter wheels in engagement with the amount actuators 33 to 36 until after the latter have been returned to normal position with the result that the restoration of these actuators differentially moves the counter wheels. Arcuate lug 136 on gear 134 is of such extent, however, that the rear end of lever 139 engages with it only in cases in which the transaction slide is in normal cash position or has been moved the first extent of movement only to indicate "received on account" transactions. In these transactions only in which money is received are amounts to be added in the counter. If the transaction slide is moved farther into the position indicating "charge" or "paid out" arcuate lug 136 moves from under the rear end of lever 139. When the parts are in this position there is no support for the rear end of lever 139 so when the other end of this lever is moved by cam 141, no rocking effect upon the frame is produced, but the lever in turn moves about the pivot 138 which connects it with the forwardly projecting portion 137 of the counter frame. The moving of the transaction segment 38 beyond the "cash" and "received on account" position and to the "charge" position or beyond, brings a notch 500 in the plate 501 carried by the transaction segment, over roller 502 on the counter-frame. By this construction the counter is rocked into engagement with the actuators only when the transaction slide is in position to indicate "cash" or "received on account" transactions.

*Locking mechanism for the counter wheels.*—Provision is made for locking the counter elements against rotation when not in engagement with the actuators. This is accomplished by means of a pawl carrying frame loosely mounted on shaft 79 within the counter frame. The side pieces 143 of this frame are connected by a rod 144 about which are loosely mounted a series of locking pawls, one of which is shown at 145 in Fig. 19. The side pieces 143 of this frame are connected at the front by a transverse plate 146 which is bent and provided with two series of notches in which the two ends of the pawls play on the order of the mounting of the retaining pawls 141 for the actuators. The side plate of this frame nearest the partition is provided with a rearward extension 147 provided with a roller 148 adapted to engage the edge 149 of transaction segment 38. This periphery 149 of the transaction segment recedes at 150 at which portion roller 148 will engage when turn to zero operations are to take place. When the roller is in engagement with portion 150 of the transaction segment, the forward end of the pawl frame will be allowed to drop sufficiently to disengage the pawls from the counter wheels and allow them to be returned to zero. From this it will be seen that the counter wheels are locked when the counter frame is in normal position and out of engagement with the amount actuators. When the frame is rocked rearwardly to mesh the totalizer wheels with the actuators, the counter wheels are moved away from their locking pawls and may be rotated. They are not completely disengaged from these pawls, however, until they have become engaged with the actuator teeth which leaves no chance for them to become disarranged before meshing with the actuators. In disengaging the counter wheels from the actuators they are engaged with the pawls before complete disengagement from the actuators is effected.

*Restoring mechanism for the transaction segment.*—Transaction segment 38 is not restored by the same mechanism that restores the other segments, as it moves in a direction reverse to them. The restoration of this segment is effected as follows. The transaction segment 38 carries a pin 151, which projects through an opening in the partition 16 of the machine to a position adjacent the rear end of goose neck lever 92, above described. This lever is provided with a pawl 152 pivoted at 153. The upper end of this pawl above the pivot, as shown in Fig. 4, is yieldingly held by spring 154 attached at one end to this end of the pawl and at the other to lever 92 toward the front of the machine. As the rear end of lever 92 is moved upwardly, pawl 152 engages over pin 151 on transaction segment 38 projecting through partition 16 and in its path, and as this end of lever 92 moves downwardly at the end of the operation of the machine, pawl 152 engages the top of pin 151 and moves it and the transaction segment supporting it downwardly and restores the latter to normal position. This restoring movement of transaction segment 38 is in a direction reverse to the restoring movement of actuators 33 to 37 since the latter mesh directly with their actuating slides while transaction segment 38 is actuated from its slide 30 through intermediate pinions 66 and 68 on stud shaft 65.

*Transfer mechanism.*—The transfer operation from one counter wheel to another is effected as follows. Each of the disks 133 of the counter wheels are provided with a notch 155 and supports a projecting member 156. In the case of the three left wheels of the counter, two of these notches and projections are formed for each wheel, because of the fact that there are two sets of numbers provided on each for convenience of manufacture and to permit of making these wheels of substantially the same size as the two right hand wheels, each of which has considerably more than ten numbers on them. A shaft 157 is mounted in the counter frame just beneath the counter wheels and is provided with a series of transfer devices, each comprising a triangular member 158, an intermediate member 159 having three fingers and a three toothed gear wheel 160. Just below this shaft 157 is shaft 79 upon which the counter frame is mounted. This shaft with in the counter frame carries a series of transfer actuating devices, each comprising a disk 161 provided with a peripheral notch 162 and with a collar 163 having a projecting finger 164 adjacent the notch 163. The members 161 and 163 are rigidly connected as are also the members 158, 159 and 160.

Shaft 79 is rotated at each operation of the machine from the drive shaft by the gearing shown in Fig. 13. The rotation of this shaft 79 is effected near the end of the operation of the machine. Shaft 79 is provided with a gear 165 meshing with a large gear 166 rigidly connected with a small gear 167 which meshes with a group of gear teeth 168 arranged on a portion of the periphery of cam 121 mounted on the drive shaft D. The normal position of these gears is shown in Fig. 13. As the drive shaft rotates in the direction of the arrow in this figure, no motion will be communicated to gears 167, 166 and 165 until near the end of the rotation of this drive shaft, when the gear teeth on the cam 121 will rotate the chain of gears 167, 166 and 165 so as to rotate the shaft 79 carrying the transfer mechanism one complete rotation. The effect of this rotation of the transfer shaft which takes place at each operation of the machine is to carry members 161 and 163 which are rigid with shaft 79 one complete rotation about their axis which will move the transfer elements 158, 159 and 160 one step in case they have been tripped by the previous rotation of the counter wheels by the restoration of the actuators. The tripping of these transfer elements is accomplished when any of the totalizer elements move to zero, in which case projecting member 156 engages or the counter wheel passing from nine to zero engages one of the fingers of the intermediate member 159 of the corresponding transfer group and rotates the group as a unit one step in the direction of the arrow in Fig. 18, so as to throw one of the fingers of the intermediate member 159 into the path of the finger 164 on collar 163. Later when shaft 79 is rotated together with members 161 and 163 in the direction of the arrow in Fig. 18, finger 164 will engage with the fingers on member 159 that has been moved into its path and positively rotate the transfer elements 158, 159 and 160 one step, which will cause one of the gear teeth on the member 160 to rotate the next higher counter wheel one step by reason of engagement of this tooth with the gear of this next higher counter wheel. As this transferring operation takes place after the counter has been rocked from engagement with the actuators, provision is made whereby the pawls 145, which normally lock these counter wheels when in this position, are disengaged from the one to which a transferring operation is to take place. This is provided for by having the fingers on the intermediate member 159 of the transfer elements in the normal position of the machine, bear against the tails of the corresponding pawls 145 but when the transfer devices have been tripped, the high part of these projections recede from the tails of their respective pawls and allow them to be disengaged from the gears of the counter wheel, due to the weight of the head of the pawls which swings them about their axis and away from the counter wheels. This transfer mechanism is described and claimed in an application for Letters Patent Serial No. 528,920, filed by the present applicant on November 19, 1909, for cash registers, and is not claimed in this application.

*Turn to zero mechanism.*—The turning of the counter to zero is accomplished by an operation of the crank handle by the following mechanism. The transaction slide, as previously stated, is provided with a resetting hole and it is by the movement of this slide that the turning of the counter to zero is controlled. As shown in Fig. 22, the totalizer drum 125 is provided with a longitudinal row of openings 169 and mounted within this drum is a transversely movable plate 170 having a row of projections 171 adapted to project through the openings 169 and into the path of turn to zero pawls 172, one mounted in the interior of each counter wheel. This transversely movable plate 170 extends through diametrical grooves in the inner sides of the heads 126 and 127 of the drum and at one end is provided with a projecting portion 173 projecting through a slot in the drum head 126 to the exterior of the drum. A projection 174 is provided on projecting portion 173 which is adapted to coöperate in a certain operation of the machine with a notched disk 175 mounted on stub shaft 176 supported in the partitions 16 of the machine frame. Projecting upwardly from the projecting portion 173 is a projection 177 carrying laterally extending pin 178 working in a slot 179 in a laterally offset portion of one end of a lever 180 pivoted at 181 to the partition 16 and provided at its other end with a downwardly and rearwardly extending portion 182 carrying a pin 183 near its end. This pin works in cam slot 184 in transaction segment 38. Slot 184 is not the same distance from the axis of this segment throughout its length but is provided with a portion 185, which is of greater distance from its axis 29 than the remaining portion.

When segment 38 is rotated in a clockwise direction (Fig. 21) to such an extent that the pin 183 of member 180 lies in the portion 185 of the slot 184, lever 180 will be moved in a counter clockwise direction in Fig. 21, with the effect of, through the projection 177 and pin 178, moving the transverse plate 170 downwardly in Fig. 22, and positioning the projections 171 through the openings 169 in the drum 125 and the ends of these projections 171 in the path of the turn to zero pawls 172 within the counter wheels. This downward movement of the plate 170 also carries the projection 174 into notch 186 in the notched disk 175. Stub shaft 176 carrying notched disk 175 also rigidly carries a segmental gear 187 adapted to mesh with mutilated gear 188 on the drive shaft D. Shortly after the drive shaft begins to rotate in the direction of the arrow in Fig. 21, it will through engagement of gears 188 and 187 rotate the notched disk 175 in a clockwise direction in this figure, and if projection 174 has been positioned in notch 186 of the disk, plate 170 and the totalizer drum 125 will also be rotated in a clockwise direction. The effect of this rotation will be to cause the projections 171 which project into the inside of the totalizer wheels to pick up the pawls of the several wheels that are not in zero position and return these counter wheels to zero position. Due to the fact that gears 187 and 188 are not continuous, gear 187, notched disk 175 and the totalizer drum and wheels will be stopped before the drive shaft stops rotating. At this instant, transaction segment 38 is being returned to normal position, as above described, which also returns transverse plate 170 through pin and slot connection 183 and 184 and pivoted lever 180 to normal position carrying the projection 174 of member 170 out of notch 186 in disk 175 and the projections 171 out of the openings 169 in the drum and out of engagement with the turn to zero pawls 172. The head 126 of the drum is, however, provided with a projection 189 adapted to be engaged by a plate 190 mounted on the side gear 188 on the drive shaft. At the end of the rotation of this drive shaft D, the peripheral edge of plate 190 strikes against the forwardly projecting corner 189 on the drum head 126 and further rotates the drum to a slight extent, sufficient, however, to position the openings 169 in the drum at the other side of the ends of the turn to zero pawls in the counter wheels. In this last movement, gear 187 and notched disk 175 do not move, as this additional movement of the drum takes place after plate 170 in the drum has been disconnected from notched disk 175 by the return of transaction segment 38 to normal position.

When the above mechanism is in normal condition and transverse plate 170 has not been moved by the transaction segment to position the projections 171 within the holes 169 in the drum, shoulder 191 of the projecting portion 173 of this plate is located in a notch 192 in side 128 of the counter frame and movement of the drum in a clockwise direction in Fig. 21 is prevented. When transverse plate 170 is moved downwardly in this figure by the adjustment of the transaction slide and segment to reset position, shoulder 191 passes out of this notch 192 in the counter frame and allows rotation of the drum therein. When the drum is being rotated in the counter frame, shoulder 191 of plate 170 engages the circular wall of the opening in the member 128 of the counter frame in which the drum is rotatively mounted and prevents the return of transverse plate 170 to normal position until shoulder 191 thereon reaches notch 192 in the member 128 of the counter frame near the end of the operation.

Provision is also made whereby the drum 125 carrying the totalizer wheels will not move with the latter when they are adjusted in adding operations through frictional engagement of these wheels with the drum. Such movement of the drum is prevented by means of a locking pawl 193 pivoted on the outside of the counter frame at 194. The upper end of this locking pawl is adapted to engage over projection 195 on the right hand head 127 of the drum. The totalizer wheels rotate in the direction of the arrow in Fig. 19 in adding operations and as locking pawl projects over projection 195, the totalizer drum will in this way be prevented from rotating in this direction. The opposite or lower end of locking pawl 193 is adapted to engage an arcuate projection 196 rigid with gear 165 pinned to shaft 79. This gear and shaft is rotated at each operation of the machine through gears 166, 167 and the toothed portion of cam 121 on the drive shaft D. The operation of these parts was explained above in connection with the transfer mechanism which is operated by the rotation of this shaft 79. As shaft 79 and gear 165 are rotated in an operation of the machine, which rotation will be in the direction of the arrow in Figs. 13, 19 and 20, arcuate projection 196 will move from under the lower end of locking pawl 193 about the time one half of the rotation of this shaft is completed but near the end of the operation of the machine and before projection 195 on drum head 127, which is rotated through connection of the other end of the drum with notched disk 175, in a resetting operation, reaches the upper end of pawl 193. When this arcuate projection 196 moves from under the lower end of pawl 193, this pawl is free to yield as projection 195 is forced under its upper end by further movement of the drum. After the drum with its projection completes its resetting movement, the rotation of gear 165 carrying arcuate projection 196 is finished, at which time arcuate projection 196 is returned to normal position under the lower end of locking pawl 193 engaging and holding the upper end of this pawl over projection 195 on the drum head.

*Mechanism for preventing operation of the machine when the transaction slide is not in proper position.*—Provision is made for preventing the operation of the drive shaft when the transaction slide is not adjusted to the proper distance for either transaction operation of the machine. This is accomplished by providing gear 134 meshing with the transaction segment and which is loosely mounted on shaft 79 and also carries arcuate lug 136, with a portion 198 having a series of notches 199, 200, 201, 202 and 203 in either of which lower rear corner 204 of a swinging detent 205 mounted for oscillation through an upwardly extending arm 205a about stub shaft 176, is adapted to engage when the transaction segment has been properly positioned for any operation. When the transaction slide is in normal position, which is for cash transactions, rear corner 204 of detent 205 will engage in notch 199, when moved to "received on account" position in notch 200, to "charge" in notch 201, to "paid out" in notch 202 and when moved to "reset" position in notch 203. The movement of the transaction slide changes the position of these notches as it does the position of arcuate lug 136 as they are in a member also integral with gear 134 which meshes with transaction segment 38 and is adjusted thereby. When transaction slide 30 and segment 38 are not properly adjusted so as to have either of the notches 199 to 203 in position to receive pointed end 204 of detent 205, this detent will, through the high portions on member 198 between the notches, be held forwardly with the forward beveled corner 206 of this detent within a recess 207 in disk 208 mounted on drive shaft D. Upon attempting to rotate the drive shaft to operate the machine when the parts are in this position, shoulders 209 at the end of recess 207 will engage the beveled corner 206 of detent 205 and, as this detent cannot move rearwardly because of its end 204 engaging a high portion of member 198 between the notches 199 to 203, rotation of the drive shaft will be prevented.

*Consecutive numbering mechanism.*—As indicated above and as shown in Fig. 7, shaft 61 at the left of the clerk's initial type wheel 69 supports the type wheels of a consecutive numbering device adapted to print both upon the record strip and the check strip the number of the particular transaction. This consecutive numbering device is shown in Figs. 11 and 12 and is of the ordinary form in which the units wheel is adapted to be actuated one step at each operation of the machine. Each of these wheels, except the highest, carries one to the next higher wheel when passing from nine to zero. The mechanism for giving the units wheel a step by step movement comprises ratchet teeth 210 on the side of this wheel adapted to be engaged by a pawl 211 carried by an arm 212 of a member 213 loosely mounted on shaft 61. This member 213 is provided on a portion of its periphery with gear teeth 214 meshing with a toothed segmental arm 215 rigid with shaft 217. This shaft 217 has a rearwardly projecting arm 218 provided with a slot 219 in which works a pin 220 carried by arm 221 mounted on shaft 222. This shaft 222 extends across division B of the frame and is mounted at its ends in the left side 12 and partition 16 of the frame and is adapted to be rocked at each operation of the machine by mechanism shown in Fig. 6, consisting of a disk 223 mounted on drive shaft D and having a cam groove 224 on its side in which plays a roller 225 on arm 226 rigidly connected with shaft 222. Rotation of the drive shaft D in the direction of the arrow in Fig. 6 will immediately rock shaft 222 in a clockwise direction in this figure and in Fig. 11 with the effect of moving member 213 and its arm 212 carrying pawl 211 in a counterclockwise direction in Figs. 11 and 12 through the connection between these elements and shaft 222 above described so as to engage the pawl 211 behind the next adjacent ratchet tooth of the unit type wheel. Due to the shape of cam groove 224, shaft 222 will later be rocked in a reverse direction returning arm 212 and pawl 211 to normal position, the pawl carrying with it, however, the units consecutive numbering wheel so as to feed it one step. The notch 227 in arm 221 shown in Fig. 11 is for connection with ribbon reverse mechanism which is old and need not be shown and described in this application. A series of holding pawls, one of which is shown at 228 (Fig. 12), is mounted on shaft 217 which serve to prevent movement of the consecutive number type wheels in a backward direction, or undue movement of them in a forward direction. They are held in engagement with the ratchet teeth of the consecutive numbering wheel by compression springs 229 mounted between the tails of these pawls and pin 230 projecting from the adjacent frame work. This construction permits the oscillation of the pawls to allow the passing of the ratchet teeth under them when the number wheels are fed in a forward direction.

*Ink ribbon frame.*—The ink ribbon carrying frame is shown in side elevation in Fig. 11. It includes two end plates 231 and 232 connected by shafts 233 and 234 near the top and shafts 235 and 236 near the bottom. These shafts also carry rollers and support the inking ribbon. These end plates are also connected by and support shafts 237 to which the check printing hammer is rigidly connected and shaft 217 above referred to, to which segmental arm 215 of the consecutive numbering device is pinned. This frame is supported on shafts 238 and 239 supported at their ends in side 12 and partition 16 of the main frame, which shafts pass through openings in the lower part of side plates 231 and 232, as shown in Fig. 11. Shaft 61 carrying the printing type also extends through these side plates and has a bearing in side 12 of the machine frame. Sleeves 56 to 60 and sleeve 90 surrounding this shaft and supporting the amount, clerk's initial, and transaction type carrier, rest in a notch 240 in side plate 231. These do not extend through the other plate 232 of this frame, as they terminate at their corresponding type carriers, all of which are located between the side plates 231 and 232 of and within the ink ribbon frame. Shafts 238 and 239 each carry within the ink ribbon frame an ink ribbon roll. Ink ribbon 241 extends from roll 238, referring to Fig. 11 in particular, upwardly, passing to the front of shaft 235, shaft 317 and between the type wheel and the check printing hammer, over rollers on shafts 233 and 234 and down at the back side of the frame between the type wheel and the detail printing hammer, not shown, back of roller on shaft 236 and to ink ribbon roll on shaft 239. Side plate 232 of this frame which lies next to side 12 of the machine frame is provided with a rearwardly projecting lug 242 having an opening 243 through which passes shaft 244 supported at its ends in side 12 and partition 16 of the machine frame. In this way shaft 244 helps to support the upper portion of the ink ribbon frame. This shaft 244 serves as a pivot for the detail strip carrying frame which will now be described in connection with the detail strip feeding mechanism.

*Detail strip carrying and feeding mechanism.*—Pivotally mounted on shaft 244, just referred to, is a frame comprising side pieces 245 and 246 which support and are connected by a number of shafts 247, 248, 249 and 250 and plate 251 adjacent its pivot 244. This frame is loosely mounted on pivot 244 and may be swung upwardly around it to provide for more readily removing and inserting the record strip. The record or detail strip 2610 is fed from roll 252 mounted in box 253, over roller 254 mounted as hereinafter described, over roller on shaft 255 eccentrically mounted at its ends in side 12 and partition 16 of the machine frame, under sleeves 256 on shaft 249 over roller on shaft 244 above plate 251, over rod 257 carried at its two ends by plates 258 pivotally mounted on shaft 249, there being one of these plates near each end of rod 257 and shaft 249. These plates and connecting rod 257 are normally held rearwardly by springs 2570 connected to the plates and the side pieces 245 and 246 of the detail strip frame, as shown in Fig. 10. From over rod 257 the record strip is wound upon receiving roll 2580 mounted on shaft 250. Shaft 248 carries near each end within the record strip frame a disk 259 with a grooved notch 260 in its periphery and also a cam member 261 adapted to engage a pin 262 on the adjacent plates 258 whereby these plates and the rod 257 carried thereby may be rocked and allowed to rock about shaft 249 as an axis. Shaft 247 rigidly carries a detail strip printing hammer 263. This shaft 247 is provided adjacent side 12 of the machine with an arm 264 carrying a pin 265 adapted to work in slot 266 in arm 267 connected to a sleeve 268 loosely mounted on the shaft 222 above referred to, which sleeve also carries arm 269 provided with a pin 270, engaged by disk 271 on the drive shaft D. Disk 271 is provided with a cam projection 272 and a notch 273 adjacent thereto, whereby when the disk 271 is rotated in a counter-clockwise direction (Fig. 3), the pin 270 will ride over cam projection 272 and be allowed to drop into notch 273 under the force of spring 274 (Fig. 10) attached at one end to plate 251 and at the other to projection 275 rigid with shaft 247 and arm 264. By this mechanism printing hammer 263 of the detail strip is allowed to strike behind the detail strip and force it and the ink ribbon firmly against the type wheel to take an impression from the latter on the detail strip.

In the operation of the machine, the operator is supposed to first write any matter which he desires on the detail strip through the opening 7 in the glass plate of the lid. It is desirable to have the printing on the detail strip done adjacent and in alinement with the matter written by the operator and to do this it is necessary after the writing has been performed to pull the record strip in a direction reverse to its general feed so as to position that portion of the strip adjacent the writing so that it may be printed upon by the printing mechanism of the machine. After the printing is performed the record strip is then pulled back to the position which it was in when being written upon and then by other mechanism led beyond this position one step to take care of the ordinary feeding operation of the paper. This is accomplished by the following mechanism: The shaft 248 projects through both side pieces of the detail strip frame and sufficiently beyond said piece 246 toward partition 16 to rigidly carry gear 276 which, when the record strip carrying frame is in position for operation meshes with teeth 277 on arm 278 rigid with shaft 222. As described above, this shaft 222 is rocked in a clockwise direction (Fig. 6) at the beginning of the operation of the drive shaft D and, through gear 277 and gear 276, this clockwise movement of shaft 222 will cause shaft 248 to be turned in a counter-clockwise direction or in the direction of the arrow in Fig. 6. As this shaft carries cams 261 at each end, these cams are moved away from pins 262 allowing the plates 258 carrying these pins to be moved forwardly about their pivots 249. As shaft 248 moves in the direction of the arrow in Fig. 6, groove disk 259 will, of course, move in the same direction, and as shown clearly in Fig. 6, edge 279 of groove 260 in these disks will engage with a record strip 2610 and as this is backed adjacent the disks 259 by the roller on shaft 255 the paper will be gripped between the edge 279 of the groove in these disks and the roller and pulled back in the direction reverse to the regular feed of the strip. The record strip is reversely moved by this operation to such an extent as to draw that part of the record strip which has been written upon from over the plate 251 to a position between the type wheel and the detail strip printing hammer 263 (Fig. 3). Springs 2570 yieldingly hold the plates 258 and rod 257 rearwardly and serve to take up any slack in the record strip that might otherwise result from the movement of the cams 261 away from the pins on plates 258. While the paper is in this reversely fed position, the printing operation of the machine takes place, after which shaft 248 is rotated in the reverse direction or in a clockwise direction (Figs. 3 and 6) by arm 278, shaft 222, arm 226 and cam 223, with the result that edge 279 of grooves 260 in disks 259 recede from roller on shaft 255 and allow these disks to release their grip upon the record strip. At the same time cams 261 operate on pins 262 of plates 258 moving in conjunction with the springs 2570 the latter rearwardly about their pivots 249 and as these plates carry rod 257 over which the record strip is mounted, the record strip will be moved by this rod back to the normal position or the position which it occupied at the beginning of the operation of the machine. When this normal position of the record strip is attained, it is moved one step farther by the following mechanism.

The shaft 250 carrying the receiving roll for the record strip projects also sufficiently beyond the record strip frame toward partition 16 to rigidly support a ratchet disk 280. A hold-back pawl 281 is yieldingly supported on stud 282 on side piece 246 of the detail strip frame so as to engage the teeth of ratchet disk 280 on shaft 250 and prevent movement of this shaft in the reverse direction. This ratchet disk is fed in the direction of the arrow in Fig. 6 so as to rotate shaft 250 and the receiving roll for the record strip one step at each operation of the machine. 283 is the actuating pawl for this ratchet disk and is yieldingly held upwardly in engagement with the teeth of this disk by means of a spring 284 connected to the pawl 283 and to an arm 285 rigid with shaft 286 supported in bearings in the left side 12 and partition 16 of the machine frame. This shaft 286 rigidly carries arms 287, one near each end, which are yieldingly held in engagement with shoulders 288 one on each of the side pieces 245 and 246 of the detail strip frame. These arms are yieldingly held in engagement with these shoulders by spring 284 and serve to hold the detail strip frame in position in the machine and from swinging movement about the shaft 244. Arm 285 has a forwardly extending portion 289 on the opposite side of shaft 286, the pressing down of which serves to rock shaft 286 in a counter clockwise direction (Fig. 4) and withdraw arms 287 from engagement with shoulders 288 of the detail strip printing frame and permit the swinging of the latter upwardly about its pivot 244.

Pawl 283 is pivotally connected to the upper arm of a double arm member 291 rigidly mounted on shaft 292. The lower arm 293 of this member is pivotally connected to bar 294 which extends toward the front of the machine and is provided at the end opposite the arm 293 with a longitudinal slot 295 through which passes driving shaft D of the machine. This bar 294 carries at its forward end a roller 296 projecting from one of its sides and into the plane of a cam 297 rigidly connected to the drive shaft. Bar 294 is yieldingly held to the rear with roller 296 against the cam 297 by means of a spring 298 fastened to the rear end of this bar and to the shaft 299 extending across the machine in the rear portion of the frame. By retaining bar 294 in its rearmost position, this spring also tends to hold pawl 283 for the ratchet wheel 280 toward the front of the machine. The normal position of bar 294, cam 297 and roller 296 is shown in Fig. 5. Upon the rotation of the drive shaft in the direction of the arrow, cam 297 begins to gradually force roller 296 and the bar 294 carrying it, toward the front of the machine. The first part of this forward movement does not effect the ratchet wheel, as the pawl 283 is normally in such position that considerable movement of it will take place before actuation of the ratchet wheel 280. By near the completion of one rotation of drive shaft D, however, bar 294 has been drawn forwardly sufficiently to actuate the ratchet wheel 280 in the direction of the arrow (Fig. 4) one step. At the end of the rotation of shaft D the high portion of cam 297 rides past the roller 296 and permits the spring 298 to draw bar 294 to the rear, causing the upper arm 290 of member 291 and the pawl 283 carried thereby to move toward the front of the machine and in position to engage behind another ratchet tooth when again actuated.

Shaft 255 is eccentrically mounted at its ends in side 12 and partition 16 of the frame. This shaft, adjacent side 12 of the machine frame, rigidly carries a projecting plate 300 having an arcuate slot 301, through which is inserted a screw 302 mounted in the side frame 12 of the machine. By loosening screw 302 and moving plate 300 about the bearings of shaft 255 this shaft will be rotated in its eccentric bearing with the result of adjusting it and the roller which it carries nearer to or farther from the disks 259. By this adjustment any wear on these parts may be taken care of.

Loosely mounted upon the shaft 255 are plates 303, one near each end of this shaft. These plates each have a rearwardly extending portion 304 which carry between them a roller 254 above mentioned. These rearwardly extending portions each have a depending portion 305 resting at the rear against shaft 306. The lower forward portions of each of these plates 303 supports a pin 307 to which is connected one end of a coil spring 308 provided with a hook portion 309 at its other end adapted to engage around shaft 306. The effect of this spring is to yieldingly hold the roller 254 against the record strip and the latter against the roller shaft 249. With rollers 254 in engagement with the roller on shaft 249 the buckling which results from backward feed of the paper will take place between the line of engagement between the rollers on shafts 254 and 249 and the line of engagement of disks 259 with roller on shaft 255.

As shown in Figs. 3 and 10, provision is made whereby when the record strip carrying frame is swung about its pivot 244, arm 264, and hammer 263 carried by shaft 247, and shaft 248 carrying disks 259 and pinion 276 are held from movement about their axes. Stud 310 (Fig. 10) is supported from partitions 16 and projects into the plane of an arm 311 pivoted at 312 on side piece 246 of the detail strip frame. Spring 313 normally tends to draw the forward end of this pivoted arm 311 down against the short stud 310. The rear portion of arm 311 is provided with a hooked end 314 adjacent recess 316 in that one of the disks 259 nearest the partition 16, and a lug 315 just above recess 317 in an upper arm 318 rigid with shaft 247. Spring 274 in the normal position of the machine tends to hold shaft 247 in the position shown in Fig. 10. The lower portion of the forward end of arm 311 is recessed and curved as shown at 319 and is provided beyond its curved portion with a shoulder 320. From an inspection of Fig. 10, it will be seen that as the detail strip carrying frame is moved upwardly about its pivot 244, the stud 310 remaining stationary, the lower curved surface of arm 311 will remain in engagement with the stud 310 but will, at the first movement of the detail strip frame, be forced upwardly slightly with the effect of throwing the rear end of this arm 311 carrying the projections 314 and 315 downwardly engaging these lugs in their recesses 316 and 317 respectively. Further movement of the record strip carrying frame about its pivot 244 will, due to the curvature of the lower surface of the forward portion of arm 311, hold these projections 316 and 317 in their recesses with the effect of holding the arm 264 on shaft 247 and disks 259 on shaft 248 in the normal position while the frame is swung from its normal position. Upon the return of the frame to normal position, pin 265 on the lower arm 264 of shaft 247 will be in position to enter the notch 266 in arm 267, pinion 276 to mesh with the teeth of arm 278, and the position of all these parts will not have been disturbed by the swinging of the frame. As the frame carrying the record strip swings upwardly, it is limited in its upward movement by shoulder 320 engaging stud 310.

*Check strip printing and feeding mechanism.*—As shown in Figs. 2 and 7, the roll 321 from which the check strip is fed is located within the guard 322 which surrounds it and retains it in proper position. From this roll check strip 323 extends past the type wheels, on the side of them opposite that by which the record strip is fed, between the electro 324 and feeding roll 325 and out through a slit in the side wall of the cabinet of the machine. The check roll 321 is mounted on a stud 326, shown in Fig. 11, projecting upwardly from a forwardly projecting flange on side plate 231 of the ink ribbon frame. The machine is designed to either issue checks, or not, and provision is made whereby the feeding of the check strip is effected, or not, as desired and when not effected, the check strip will not be printed upon. Electro 324 and feeding roll 325 are geared together by gears 326 and 327 carried respectively by these members.

Electro 324 and feeding roll 325 are supported within a frame comprising, as shown in Fig. 8, a vertical portion 328 fastened to side 12 of the machine frame, and laterally bent and rearwardly projecting portions 329 and 330 at the top and bottom respectively of the portion 328. Electro 324 has end bearings in the bent portions 329 and 330, as does also a shaft 331, passing axially through feeding roll 325 serving to hold it in position. Shaft 331 is provided at each end above and below bent portions 329 and 330 respectively with a cam 332 rigid with shaft 331 which may be turned by handle 333 on the upper end of this shaft. These cams bear against sliding plates 334, one for each cam, provided with slots 335 in which work pins 336 mounted in the bent portions 329 and 330 of this frame. These plates are also provided with a recess 337 adjacent notches 338 in the rear ends of the bent portions 329 and 330 in which the projecting ends of electro 324 are normally located. The electro is held in place in these notches by the sliding plates 334 which are normally held toward the front of the machine and against the cams 332 by springs 339 attached at one end to pins projecting from the bent portions 329 or 330 and at the other ends to the sliding plates 334. When these plates 334 are held forwardly against cams 332, ends 340 of the recesses 337 engage behind the projecting ends of electro 324 which are located in the notches 338 and hold the electro in place. By rotating shaft 331 and cams 332 in a counter clockwise direction in Fig. 7 these plates 334 will be forced rearwardly against the tension of the springs 339 carrying end 340 of recesses 337 out of the way of the projecting ends of the electro 324 and permitting the sidewise removal of the latter from the machine through lateral notches 338 in the bent portions 329 and 330. Release of the handle 333 allows springs 339 to return the plates 334 to their normal forward position. To insert an electro it is only necessary to operate handle 333 to move the plates 334 rearwardly, which will permit insertion of an electro. Upon the return of the handle to normal position the electro will be held in place in the notches 338 by the plates 334 which will be moved forwardly to normal position and held in this position by springs 339, thus locking the electro in place.

The rear ends of bent portions 329 and 330 are provided with notches 341 in which are located the ends of a shaft 342 carrying an inking roll 343 for the electro. This shaft is held in place in these notches by engagement at each end with arms 344 rigid with shaft 345 supported in the rear ends of the bent portions 329 and 330. A coil spring 346 surrounding this shaft tends to hold it in such position that arms 344 rigid therewith engage the ends of shaft 342 and hold it in the notches 341 with the inking roll in engagement with the electro. To remove the inking roll, it is only necessary to rotate shaft 345 against the tension of its spring 346 thus carrying arms 344 from engagement with shaft 342 and permitting the removal of the latter. Vertical portion 328 of the check feeding frame is removed at the rear portion of this frame adjacent the feeding roll 325, electro 324 and inking roll 343. This permits the lateral insertion and removal of these members and the outward feeding of the check from between the feeding roll and the electro. The electro may bear any desired printing characters for printing on the check strip such as the date or advertising matter if desired.

Gear 327 on feeding roller 325 meshes with gear 347 carried by sleeve 348 loosely mounted upon shaft 349 also journaled in bent portions 329 and 330. This shaft 349 is provided with a gear 350 meshing with a mutilated gear 351 mounted on a short vertical shaft 352 supported from bracket 353 bolted to the frame of the machine. Shaft 352 carries at its lower end bevel gear 354 meshing with the bevel gear 355 on main drive shaft D of the machine. As this shaft D is rotated at each operation of the machine, it will follow that gear 354, shaft 352, mutilated gear 351, gear 350 and shaft 349 supporting it, will be rotated at each operation of the machine. Provision is made for rotatively connecting or disconnecting shaft 349 with sleeve 348 carrying gear 347 as desired, whereby the rotation of feed roll 325 and electros 324 may be controlled. The coupling and uncoupling of sleeve 348 loose on shaft 349 with this shaft is accomplished by means of a movable clutch member 356 splined to shaft 349 and provided with a peripheral groove 357 and with coupling teeth 358 which coöperate with notches 3580 in the adjacent end of the sleeve. This coupling and uncoupling is effected by longitudinal movement of the movable clutch member splined to shaft 349. It is given this axial movement for clutching and unclutching operations by means of a lever 360 pivoted at 361 and provided with a roller 362 mounted in the peripheral groove of the movable clutch member. The arm of this lever opposite the rollers 362 is provided with a pointed end 363 and a button 364, the latter of which extends through a slot in the frame of the machine and in the cabinet so as to be capable of operation by the hand of the operator from outside the cabinet. The upper portion of this lever just above the pivot 361 is provided with a projection 365 adapted to engage in one of the notches 3580 in sleeve 348 when the movable clutch member is disengaged from this sleeve so as to positively prevent rotation of sleeve 348 when the clutch is disconnected. The pointed end of lever 363 is adapted to engage in either of two notches 366 or 367 of a lever 368 pivoted on stub shaft 369 supported by the frame of the machine. The lower end of this lever 368 is normally drawn toward the pivot 361 of lever 360 by a spring 370 fastened to the frame of the machine and the lower end of this lever. Between the notches 366 and 367 is an intermediate portion 371. The upper end of lever 368 is provided with a projection 372 adapted to engage in a notch 373 in a disk 374 rigidly connected with the drive shaft D. When the pointed end of lever 360 is in either notch 366 or notch 367, projection 372 will not engage in notch 373 of the disk 374 but will permit rotation of this disk and the driving shaft D. When, however, the pointed end of lever 345 is in the intermediate position and engaging the intermediate portion 371 of the lower portion of the lever 368, projection 372 will be located in the recess 373 and rotation of the drive shaft at this time will be prevented. When lever 360 is in the upper notch 366, shaft 349 is uncoupled from the sleeve 348 and projection 345 engages in one of the notches in sleeve 348. When, however, lever 360 is located in the lower notch 367 in lever 368, projections 358 on the movable clutch member 356 will engage in their corresponding notches 3580 in sleeve 348 and rotatively couple this sleeve with shaft 349. In this condition of these parts upon the rotation of drive shaft D, shaft 349 will rotate sleeve 348 which in turn serves to rotate the feeding roll 325 and electro 324 with the result of feeding the check strip out through a slit in the left side of the machine cabinet at each operation of the machine. Gear 351 is a mutilated one, and is constructed to provide for the feeding of the check strip only taking place after the printing operations have been performed on it. In operating the machine, shaft D rotates in the direction of the arrow in Fig. 8 with the effect of rotating mutilated gear 325 in the direction of the arrow in Fig. 7. As clearly shown in the latter figure, gear 225 will have to rotate through a considerable angle before gear 350 starts to rotate, thus postponing the feeding of the check until after it has been printed upon by other mechanism of the machine.

375 represents the printing hammer for the check strip which is rigidly mounted upon shaft 237 above referred to in connection with the ink ribbon frame. This shaft 237 is also provided with an arm 376 having an upwardly projecting portion 377 which is attached to one end of a spring 378, the other end of which is attached to side plate 231 of the ink ribbon frame. The tendency of this spring is always to force the printing hammer 375 toward the printing type. This hammer is drawn in the opposite direction, however, by means of a bar 379 having a hooked end 380 (Figs. 3 and 9) which hooks over the driving shaft D. This bar carries a lug 381 projecting from its side and into the plane of a cam disk 382 rigidly connected to the driving shaft D. As driving shaft D is rotated, near the beginning of the operation of the machine, the high portion 383 of this cam rides past the lug 381 on the bar 379 and allows this bar and the printing hammer 375 to be thrown rearward against the printing type by the spring 378 above mentioned. To provide for sufficient movement of the bar 379 and printing hammer 375 in this direction, a recess 384 is formed in the cam 382 adjacent the high portion 383. This provides for sufficient movement of the type hammer 375 to take a printing impression upon the record strip. This printing operation just described may be prevented and is so when lever 360 is in the position shown in Fig. 8 in which no check is to be fed from the machine. For this purpose, stub shaft 369 besides carrying lever 368 also carries a member 385 rigidly carrying an arm 386 provided with a lug 387 at its end. This member 385 is also provided with another arm 388 with a slot 389 in its end adapted to engage over pin 390 on lever 360. A pin 391 is mounted upon bar 379 for coöperation with the lug 387 on arm 386. By this construction when lever 360 is in the position shown in Figs. 8 and 9, engaging in the upper notch 366 of lever 368, arm 386 and lug 387 are in the position shown in Fig. 9 with lug 387 just back of pin 391. If the drive shaft is rotated when the parts are in this condition, printing hammer 375 and bar 379 will not be drawn rearwardly by spring 378 because such movement is prevented by engagement of pin 391 with lug 387 on arm 386. When, however, the forward end of lever 360 is moved downwardly to couple the shaft 349 and sleeve 348 to rotate together, arm 388 will be rotated in a clockwise direction in Fig. 9 through engagement with the pin 390 in slot 389, which movement will throw arm 386 and lug 387 downwardly out of the path of pin 391 on bar 379. If the machine is operated in this condition, the printing hammer will be free to be operated by spring 378 when the high portion 383 of cam 382 passes lug 381 on the hooked end of bar 379.

*Drawer locking and releasing and coin display mechanisms.*—As shown in Fig. 13, there is mounted just inside the right side 13 of the frame of the machine, a drawer locking lever 392 rigidly connected with shaft 393 extending transversely the entire width of the machine. The forward end 394 of the lever is provided at its extremity with a hook 395 adapted, when the drawer is closed and the machine is in normal condition, to hook over the forward end of a ledge 396 on the drawer and hold the latter in closed position. This forward end of lever 392 is bowed upwardly to clear shaft 2, to which the handle 3 of the machine is connected. The rear end of locking lever 392 is provided with a pin 397 working in a notch 398 in the adjacent end 399 of a bell crank lever mounted loosely on shaft 292 above referred to in connection with the detail strip feeding mechanism. The forward arm 399 of this bell crank is yieldingly held upward by a spring 400 attached to the frame of the machine at 401 and to the lever with the effect of, through the pin and notch connection 397 and 398, always tending to hold the forward end of locking lever 392 downward and over the forward end of ledge 396 on the cash drawer. The rear arm 402 of the bell crank lever which is loosely mounted on shaft 292, is provided with an offset lug 403, the purpose of which will appear later. Shaft 393 to which lever 392 is rigidly connected extends the width of the machine and carries, as shown in Fig. 14, an arm 404 rigid therewith adapted to coöperate with a cam 405 on drive shaft D of the machine. Shaft 393 loosely carries adjacent arm 404, a two armed member 406, the forward arm of which coöperates with a collar 407 rigid on the drive shaft D, and provided with a projecting finger 408. This projecting finger on collar 407 is undercut in its lower portion, as shown in Fig. 14.

The arm 404 is provided with a forwardly projecting portion 409 bent laterally at its end to engage over and in front of the forward arm of member 406. One end of a spring 410 is attached to ear 411 on arm 404 rigid with shaft 393, while the other end is connected to rear arm 412 of the two armed lever 406. The effect of this spring is to tend to draw arms 404 and 409 respectively from cam 405 and collar 407 and separate these arms. The normal position of these parts is as shown in Fig. 14 with the end of the forward arm 406 engaging in the undercut portion of the finger in collar 407 and with the end of arm 404 just below projection 413 on cam 405. Arm 404 which is rigid with shaft 393 is yieldingly held against the cam 405 as shown in this figure by spring 400 above referred to. The end of arm 406 is held against the collar 407 against the tension of spring 410, by engagement beneath the undercut finger 408. By this construction, it is necessary at the beginning of an operation of the crank handle to turn it backward slightly so as to turn collar 407 slightly in a clockwise direction as viewed in Fig. 14 and to free arm 409 from under the finger on collar 407. This allows spring 410 to draw arm 409 forwardly out from under the finger on collar 407 and against the laterally bent portion 409 of arm 404, when the shaft may be rotated in the forward direction. The backward movement of this shaft is limited, however, by the engagement of end of arm 404 with undercut projection 413 on cam 405. After the spring 410 has drawn the forward arm of two armed member 406 away from in front of cam projection 408 on collar 407, the drive shaft D may be rotated in a forward direction, which is in the direction of the arrow in Fig. 14. The rotation in this forward direction will cause the cam 405 to gradually force arm 404, which is rigidly connected with shaft 393, in a clockwise direction about this shaft 393, as shown in Fig. 14, which will at the same time gradually rotate locking lever 392 in the same direction with the result that at near the completion of the rotation of the driving shaft in this direction, hook 395 on the forward end of this locking lever 392, will be moved upwardly from in front of ledge 396 on the drawer of the machine and permit the forcing forward of the latter by springs located at the rear of the drawer for this purpose as is common in the art. As the forward end of locking lever 392 is forced upward by this operation, the rearward end will, of course, be forced downward and as the drawer moves outward to an extent in which the rear end of ledge 396 passes the tail 414 of a pivoted locking member 415 pivoted at 416 having a hooked portion 417 at its top, the tail 414 of this locking member will be permitted to drop by gravity causing the hooked portion 417 of this member 415 to engage over a pin 418 on the rear end of lever 392 and hold this lever with its rear end in lowermost position.

Return of the drawer by the operator will cause the rear end of ledge 396 to raise the tail 414 of this locking member 415 and disengage the upper end 417 from over pin 418 and allow spring 400 through arm 399 to move the lever 392 to normal position when the drawer is completely closed and the forward end of ledge 396 has passed from under hook 395 on the forward end of this lever. When these parts have returned to normal position hook 395 engages in front of ledge 396 and the drawer is locked in closed position.

Before the drawer is unlocked by the above mechanism, shaft 292 has been rotated by means of bar 294 and the mechanism shown in Fig. 5, in the direction of the arrow in Fig. 4. This shaft 292 carries an arm 419 provided with a pin 420 which engages with a bell crank 421 pivoted at 422 having the front arm 423 projecting into the path of pin 420 on arm 419. The rear arm of bell crank 421 is provided with a slot 424 in which plays a pin 425 on one arm of a bell crank 426 rigid with shaft 299 and having a lower projecting arm 428. As arm 419 moves in a clockwise direction about the shaft 292 (Fig. 13) bell crank 421 will be moved in a counter clockwise direction about its pivot 422 with the result of bell crank 426 being rotated in a clockwise direction about its axis 299 so as to move its lower arm 428 into a position above the lateral projection 403 on arm 402 of the bell crank loosely mounted on shaft 292. After arm 428 of bell crank 426 is moved into its forward position, as above described, then the previously mentioned movement of arm 402 of bell crank 399, which takes place upon the unlocking of the drawer, occurs and lug 403 moves to the rear of arm 428 and locks bell cranks 426 and 421 in the position to which they have been moved.

Bell crank 426 is rigid with shaft 299 which carries (Fig. 4) a pivotally mounted bottom 429 which, by the above operations, is moved to close the bottom of a receptacle 430 through which drops the coins from the coin displayer mechanism proper to the cash drawer. By this means coins are prevented from dropping from this receptacle when the drawer is opened. This coin display is shown in side view in Figs. 3 and 4 and in top view in Figs. 1 and 2 and is of old and known construction divided into a plurality of compartments by a rotary finger carrying member given a step by step movement at each operation of the machine, to carry the coins from the place where they enter the coin display to an opening in the bottom through which they leave it and drop into the cash drawer. This rotary member is given a step by step movement at each operation of the machine by the rotation of shaft 292 which carries an arm 431 provided with a pin 432 working in a notch 433 in an arm 434 depending from a slide 435 which is connected with the rotary member of the coin display so as to move the latter one step at each to and fro movement of the slide given at each operation of the machine by the oscillation of the shaft 292 by the above mentioned connections.

As shown in Fig. 13, the oscillation of shaft 292 serves to sound an alarm at each operation of the machine. For this purpose the shaft rigidly carries arm 436 to which is pivotally mounted at 437 member 438 having a projection 439 adapted, when the shaft 292 is rotated in the direction of the arrow in Fig. 13, to strike a lateral projection 440 or striking hammer 441 for bell 442 and move the hammer 441 about its pivot 443 in a counter clockwise direction against the tension of spring 444 attached at one end to the frame of the machine and at the other to projection 440 on the striking hammer. As shaft 292 continues to move in the direction of the arrow in this figure projection 439 will become disengaged from projection 440 on striking hammer 441 when the spring 444 will be free to actuate the striking hammer in the reverse direction to ring the bell 442. As shaft 292 returns in a counter clockwise direction in Fig. 13 to normal position, projection 439 will be allowed to pass projection 440 on the striking hammer since this projection 439 is on the pivotally mounted member 438 which is free to swing to allow its return with arm 436 and shaft 292 to normal position. Pivotally mounted member 438 is provided with laterally bent portions 445 and 446 which project into the plane of arm 436 on shaft 292 and serve to prevent undue swinging of this member in either direction.

The drive shaft D of the machine is rotated once at each operation of the machine by means of handle 3 carried by shaft 2 which extends from right side 13 to partition 16 of the machine frame. Adjacent partition 16 this shaft 2 carries a gear meshing with a gear on the drive shaft D. Drive shaft D extends completely through the machine and carries the various cams and gears referred to in the above description as located on it. The gearing between the handle shaft 2 and the drive shaft D is such that two complete rotations of the handle are necessary to rotate the drive shaft one complete rotation.

*Operation.*—The operations of the various mechanisms of the machine have been described above in connection with their detail description, but for the sake of clearness these operations will again be briefly referred to in connection with the general operation of the machine. In using the machine before the crank handle is turned, the differential mechanism of the machine is adjusted by the adjustment of slides 25 to 30 and, if desired, the operator writes any matter pertaining to the particular transaction, such as the name of the customer, that he desires upon the record strip through the opening 7 in the glass portion 6 of the cabinet lid. If the transaction is a cash one, the transaction slide 30 is not moved since this slide and the differential mechanism and type carrier which it controls normally stands in position to handle cash transactions. In this operation, however, as well as in all others, the clerk's slide 29 must be moved to withdraw clerks initial segment 37 from engagement with the rear arm of lever 76 to allow spring 88 to withdraw member 83 from locking engagement with the drive shaft and permit the latter's rotation. The movement of the clerk's initial slide and segment through sleeve 44, toothed disk 50, pinion 55 and sleeve 590 on shaft 61 differentially positions the clerk's initial type wheel 69. Adjustment of the amount slides 25, 26, 27 and 28 differentially positions amount actuators 33, 34, 35 and 36 which are respectively connected to and serve to position amount type wheels 74, 73, 72 and 71, by sleeves 40, 41, 42 and 43, toothed disks 46, 47, 48 and 49, pinions 51, 52, 53 and 54 and sleeves 56, 57, 58 and 59. Operation of the crank handle 3 when the amount and clerk's initial slide have been adjusted will cause the printing upon the detail strip of the amount of the transaction, the initial of the clerk making it, a character indicating the kind of transaction, and the consecutive number of the transaction. The same information will be printed upon the check strip and the latter fed from the machine in position to be torn off if the button 364 projecting through the left side of the machine cabinet from lever 360 is in check issuing position. If this button and the lever carrying it are not in check issuing position the driving connection between the drive shaft of the machine and the feed roll for the check strip will be destroyed and the operating mechanism for the check printing hammer rendered ineffective in a manner clearly described above.

To operate the machine after the differential slides 25 to 30 have been properly positioned the crank handle 3 is rotated twice in the direction of the arrow in Fig. 1. As shaft 2 carrying handle 3 is directly geared to drive shaft D as above explained, before it can be rotated in the direction of the arrow in Fig. 1, it must be rotated slightly in the reverse direction to rotate the drive shaft D slightly in a clockwise direction in Fig. 14 and free the end of the forward arm of member 406 from beneath the undercut finger 408 on collar 407 thus allowing spring 410 to throw this arm forwardly and out of the path of finger 408 to permit rotation of the drive shaft in the forward direction, or in the direction of the arrow in Fig. 14. The backward movement of the drive shaft and handle is slight and is limited by engagement of arm 404 with projection 413 on cam 405. This movement is sufficient, however, to carry finger 408 on collar 407 from over the upper end of the forward arm of member 406 and allow the latter to move out of the path of this finger, after which the drive shaft is free to be rotated one complete rotation in a forward direction.

The first movement of the drive shaft in the forward direction through cam 121, bar 118 and pawl carrying frame 113 serves to lock the amount actuators and clerk's and transaction segments in adjusted position. About the time or slightly after this locking of the actuators and segments is effected the printing hammers are allowed to be actuated by their springs by the high portions 272 and 383 of their controlling cams on the driving shaft respectively passing lugs 270 and 383 on members 269 and 379 and releasing these members and their corresponding printing hammers 263 and 375 so they may be actuated by their springs 274 and 378. Before the printing operations take place, however, shaft 248 carrying notched disks 259 and cams 261 has been rotated in a counter clockwise direction in Fig. 6 by means of pinion 276, arm 278, shaft 222, arm 226 and cam 223 to draw in a manner above described, the record strip 2610 in a direction reverse to the arrow in this figure sufficiently to position that portion of it that, previous to the operation of the machine, was located over plate 251 in position to be written upon between the type wheels and the detail printing hammer 263. After the printing operations take place shaft 248 will, due to the shape of cam 223, be rotated in the reverse direction and cause, in a manner clearly described above, the record strip to be carried by rod 257 back to its original position. After being returned to its original position the record strip is fed one step in a forward direction through rotation of its receiving roll one step by means of ratchet disk 280, pawl 283, member 293, bar 294 and cam 297 on the drive shaft, as described. After the printing operation has taken place, if the machine is set for issuing checks the printed check strip is also fed from the machine by check feeding roll 325, simultaneous with which feeding it is printed upon by electro 324.

As shaft 222 is rotated in the direction of the arrow in Fig. 6 by cam 223, the actuating pawl for the consecutive number type wheels is, through arm 221 rigid with this shaft, moved to engage behind the next adjacent ratchet tooth of the units type wheel and as the shaft is returned to normal position later in the operaton of the machine, the pawl will be actuated to feed the units type wheel one step in a forward direction. This positions the consecutive number type wheels to represent the number of the next operation of the machine.

When the printing operations are completed the amount actuators and clerk's segment are restored to normal position by yoke 89. This yoke is moved in a clockwise direction in Fig. 13 by shaft 89, rigidly supporting it, gear 90, lever 92, and actuating member 94 therefor on the drive shaft provided with fingers 95, 96 and 97 coöperating with rollers 98, 99 and 100 on the lever 92. After restoring yoke has been moved to return the amount actuators and clerk's segment to normal position, it is returned to its normal position by cam 101 on drive shaft D, acting on roller 102 on the lever 92.

If the transaction slide is in position to indicate "cash" or "received on account" transactions the counter will be rocked into engagement with the amount actuators before their restoring movement by cam 141 on the drive shaft D which actuates lever 139 for the counter frame. When the transaction slide and segment is in either of these positions arcuate projection 136 on gear 134 will be a fulcrum for the rear end of lever 139 and actuation of the forward end of this lever by cam 141 will rock the counter frame about shaft 79 carrying the counter wheels into engagement with the amount actuators before their restoring movement, and out of engagement with them after they have been restored to normal or zero position. In case the transaction slide and segment are in "paid out" or "charge" positions arcuate projection 136 on gear 134 will be moved from under the rear end of lever 139 and the counter wheels will not be rocked into mesh with the amount actuators but this lever 139 will merely oscillate about pivot 138 connecting it with the counter frame. The counter is intended to receive only amounts of transactions in which money is received.

To turn the counter to zero, transaction slide is moved to the "reset" position which movement, through transaction segment 38, lever 180, and transverse plate 170 in the totalizer drum couples the drum with the notched disk 175 driven from gear 188 on the drive shaft D and with the turn to zero pawls on the counter wheels. As the drum is rotated in a clockwise direction in Fig. 21, the totalizer wheels will be picked up by the projections 171 on plate 170 projecting through the openings 169 in the drum and returned to zero positions in a manner clearly described in connection with the detail description of this mechanism. In the resetting operation of the counter arcuate projection 136 does not support the rear end of lever 139 and the counter is not rocked into engagement with the actuators.

Transaction segment 38 with its slide 30 is returned to normal position by pawl 152 on lever 92 coöperating with pin 151 on the transaction slide. As the rear end of lever 92 is moved downwardly pawl 152 engages pin 151 and moves the transaction segment in a counter clockwise direction in Fig. 21, restoring it to normal position. By this restoring movement of transaction segment 38 lever 180 and transverse plate 170 in the totalizer drum are returned to normal position withdrawing projections 171 on the transverse plate from engagement with the totalizer wheels and this plate from engagement with the notched driving disk 175.

Near the end of the operation of the machine and after the counter has been disengaged from the amount actuators, shaft 79 is given one complete rotation by gear connection with the toothed portion of the periphery of cam 121 to take care of the transfer operations between the counter wheels, in a manner clearly described above.

As the drive shaft is rotated cam 405 thereon, through arm 404 and shaft 393 rigidly carrying it, gradually moves drawer locking lever 392 in a clockwise direction in Fig. 13. By near the completion of rotation of the drive shaft this lever has been moved sufficiently in this direction to carry its forward end from in front of ledge 396 on the drawer and allow the latter to open. At about the same time the laterally bent rear end of arm 402 rigid with arm 399 engages behind arm 428 rigid with shaft 299 which has been rocked in a manner specifically described above to close the bottom for the lower portion of the coin display, and locks the arm 428 and its shaft 299 in their moved position holding the bottom of the coin display closed. The parts are held in this position while the drawer remains open, by the locking member 415 engaging over pin 418 on lever 392, and by the engagement of the forward end of lever 392 with the top of the ledge 396. When the drawer is being closed ledge 396 on the drawer raises the tail of locking member 415 and disengages it from pin 418, and when the drawer is in completely closed position hook 395 of lever 392 projects in front of ledge 396 on the drawer and holds it in closed position.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with actuating mechanism, a counter therefor, a movable frame carrying the counter normally holding the latter out of engagement with the actuating mechanism, a cam, a lever pivoted to the counter frame and operatively connected to the cam, a fulcrum for the lever, and manipulative means for moving the fulcrum whereby operation of the lever by the cam will not move the counter into engagement with the actuating mechanism.

2. In a machine of the class described, the combination with a movable counter carrying frame, a lever and operating means therefor for moving the frame, and means whereby the fulcrum of the lever may be withdrawn to prevent movement of the frame when the lever is operated.

3. In a machine of the class described, the combination with a counter actuating device, a counter adapted to be moved into and out of engagement therewith, a lever operatively connected with the counter for giving it such movement, a cam for operating the lever, a rotatable member having an arcuate projection forming the fulcrum for said lever, and manipulative means for rotating the rotatable member to withdraw the arcuate projection from supporting relationship with the lever.

4. In a machine of the class described, the combination with a counter, a set of actuating devices therefor, a lever for rocking the counter into engagement with the actuating devices, a transaction slide, a transaction segment rotated thereby to differential extents, a rotary fulcrum for the lever, and connections whereby rotation of the segment effects rotation of the fulcrum to control its operative relation with the lever.

5. In a machine of the class described, the combination with differentially movable actuators, a restoring yoke therefor, a shaft for driving the yoke, an oscillating segment gear adapted to drive the shaft provided with a series of pins, a driving shaft, a member rigid therewith provided with a series of fingers each adapted to engage over a corresponding one of the pins to oscillate the segment in one direction and thereby the restoring yoke, a second cam on the drive shaft, and a roller on the oscillating segment gear coöperating therewith, the cam and roller arranged and constructed to permit movement of the segment and yoke in one direction by the pin and finger connections and to cause the reverse movement of these members at a later stage in the operation.

6. In a machine of the class described, the combination with a differentially movable transaction segment, of restoring means therefor comprising a laterally projecting pin on the transaction segment, an oscillatory lever, means for oscillating the same, and a yieldingly mounted pawl carried by the lever adapted to engage over the pin on the transaction segment when the lever is moved in one direction and to engage the pin and to restore the segment to normal position upon the return movement of the lever.

7. In a machine of the class described, the combination with a clerk's initial slide, a segment actuated thereby, a drive shaft for the machine carrying a locking projection, a locking member adapted to engage the projection to lock the driving shaft against rotation, a spring tending to disengage these locking elements, and a pivotally mounted member operatively connected with the locking member and projecting into the path of the segment whereby when the latter is in normal position the locking member will be held thereby in engagement with the locking projection against the tension of the spring but will be withdrawn by the spring from such engagement when the segment is moved from normal position.

8. In a machine of the class described, the combination with a hollow drum provided with a row of openings therein, counter wheels mounted upon the drum and provided with turn to zero pawls, a shiftable member mounted within the drum and provided with a row of projections in line with the openings in the drum, and also provided with a portion projecting from one end of the drum, a notched driving disk mounted adjacent the projecting position, a manipulative device, and connections between said device and the shiftable member whereby the latter may be shifted to position its row of projections through the openings in the drum so as to coöperate with the turn to zero pawls of the counter wheels and to position the projecting portion of the shiftable member within the notch in the driving disk whereby the shiftable member and the drum in which it is mounted may be rotated from the driving disk.

9. In a machine of the class described, the combination with a printing mechanism, of a supply roll and a receiving roll for a record strip adapted to be written upon and to receive impressions from the printing mechanism, a stationary frame for carrying said rolls, means for moving that part of the record strip between the supply and receiving rolls without effecting any movement of said rolls so that that portion of the strip adjacent to that in writing position will be moved into printing position and for then moving this part of the strip back to original position, and means for advancing the strip from the supply roll on to the receiving roll so that a fresh surface is brought into writing position.

10. In a machine of the class described, the combination with a differentially movable slide, a segment actuated thereby a totalizer drum, totalizer wheels loosely mounted thereon, locking means for the totalizer wheels rendered ineffective by the movement of the segment, a driving member for the drum normally out of operative connection therewith, means controlled by the movement of the segment for operatively connecting the drum and its driving member, and with the totalizer wheels for a turn to zero operation, and means for returning the segment to normal position after the totalizer wheels have been moved to "zero" position thereby operatively disconnecting the drum from its driving member and the totalizer wheels and causing the engagement with the latter of the locking means for locking them in moved position.

11. In a machine of the class described, the combination with a differentially movable slide, a segment actuated thereby, a totalizer drum, totalizer wheels loosely mount thereon, locking means for the totalizer wheels rendered ineffective by movement of the segment, a driving member for the drum normally out of operative connection therewith, means controlled by the movement of the segment for operatively connecting the drum and its driving member, and with the totalizer wheels for a turn to zero operation, means for returning the segment to normal position after the totalizer wheels have been moved to "zero" position thereby operatively disconnecting the drum from its driving member and the totalizer wheels and causing the engagement with the latter of the locking means for locking them in moved position, and means for rotating the totalizer drum an additional step after the totalizer wheels have been locked and the drum operatively disconnected from its driving member and the totalizer wheels.

12. In a machine of the class described, the combination with a manipulative device, a totalizer drum, totalizer wheels loosely mounted thereon, locking means for the totalizer wheels rendered ineffective by the operation of the manipulative device, a driving member for the drum normally out of operative connection therewith, means controlled by the operation of the manipulative device for operatively connecting the drum with its driving member and with the totalizer wheels for a turn to zero operation, means for preventing the operative disconnection of the parts until the totalizer wheels have reached their zero position, and means for restoring the manipulative device to normal position after the totalizer wheels have been moved to normal position thereby locking the wheels in moved position and operatively disconnecting the drum from its driving member and the totalizer wheels.

13. In a machine of the class described, the combination with a hollow totalizer drum, a frame in which the drum is rotatively mounted, a plurality of counter wheels carried by the drum each carrying a turn to zero pawl, a longitudinal row of openings in the drum one adjacent each totalizer wheel, a diametrically movable member mounted within the drum having a row of projections one for each opening, and an end portion projecting from the end of the drum, a driving disk for the drum adapted to be operatively connected with the end portion of the diametrically movable member, a recess in the frame adapted to receive a part of the end portion when the parts are in their normal position and prevent rotation of the totalizer drums, a pin on the projecting end portion, a pivoted member having a slot at one end coöperating with the pin, a pin carried by the other end of the pivoted member, a movable segment provided with a cam slot coöperating with the pin on the lever, and means for moving the segment whereby the lever will be rocked and the diametrically movable member within the drum, moved to remove the projecting portion thereof from the recess in the frame, to position a portion of the projecting end within the notch in the driving member, and to position the row of projections through the row of openings in the drum and into position to operatively connect with the turn to zero pawls of the counter wheels.

14. In a machine of the class described, the combination with a totalizer drum having a longitudinal row of openings therein, totalizer wheels loosely carried thereby, a diametrically movable member within the drum having a row of projections adapted to be positioned in and to project through the openings in the drum to coöperatively engage with the totalizer wheels to turn the latter to zero, and means for moving the diametrically movable member including a rod within the drum mounted in the ends of the same and carrying an arm near each end working in a corresponding slot in the diametrically movable member whereby both ends of the member are caused to move together.

15. In a machine of the class described, the combination with a set of actuating segments, a set of pivoted alining pawls therefor, a pivoted frame for the pawls adapted to engage them either above or below their pivots, springs tending to separate the upper portion of the frame and the upper ends of the pawls to engage the latter with the actuating segments, a link connected with the frame, and a cam on the drive shaft operatively connected with the link adapted to normally hold it and the pawl frame in an intermediate position in which the pawls are yieldingly held against the actuating segments, but when operated constructed to move the link and the upper portion of the frame to lock the pawls in engagement with the actuators, later to withdraw them completely therefrom, and finally to return the frame to normal intermediate position in which the pawls yieldingly engage the actuating segments.

16. In a machine of the class described, the combination with type carriers, a record strip carrying frame adjacent the type carriers, a printing hammer for forcing the record strip against the type wheels to take an impression thereon, a plate for supporting the record strip at a position to be written upon, means for moving the record strip so as to position the portion that was in position to be written upon, adjacent the printing type to receive an impression therefrom and then returning the same to normal position, and means for feeding the record strip an additional step after it has been returned to original position.

17. In a machine of the class described, the combination with a pivotally mounted record strip carrying frame, a printing hammer carried by the frame, normally operatively connected with actuating mechanism therefor, an arm carried by the frame, and means whereby movement of the frame about its pivot from normal position causes engagement of the arm and the printing hammer whereby the latter is prevented from dislocation when the frame is out of normal position and is held in position to properly engage its actuating mechanism when the frame is returned to normal position.

18. In a machine of the class described, the combination with printing mechanism of a detail strip supporting and feeding mechanism consisting of a frame comprising side pieces, and a plurality of rods connecting them and carrying a record strip, a support for the record strip at a place to be written upon, a shaft in the frame carrying a grooved disk near each end, a roller adjacent the disks but on the other side of the record strip and means for rotating the disk carrying shaft to grip the record strip between the disks and their opposing roller and move it so as to position the portion that was in position to be written upon in position to be printed upon adjacent the writing by the printing mechanism, and then rotating the shaft and disks in the reverse direction to return the record strip to original position.

19. In a machine of the class described, the combination with a record strip carrying frame including a support for the portion of the strip to be written upon, a pivoted auxiliary frame over which the record strip extends, a disk carrying shaft mounted in the frame adjacent the record strip and carrying cams coöperating with the auxiliary frame, printing mechanism, and means for rotating the disk and cam carrying shaft in one direction to allow the auxiliary frame to yield and to move the record strip to position that portion which was in position to be written upon in position to be printed upon by the printing mechanism, and then to rotate the disk and cam carrying shaft in the reverse direction to cause the cams to move the auxiliary pivoted frame to its original position thereby returning the record strip to its original position.

20. In a machine of the class described, the combination with printing mechanism, record strip supporting mechanism, a cover for the record strip provided with an opening through which the record strip may be written upon, a pivoted frame for supporting a portion of the record strip, on one side of the opening and the printing mechanism, a rotating member engaging a portion of the record strip on the other side of the opening and the printing mechanism, connections between the rotating member and the auxiliary frame whereby when the rotatable member is moved in one direction the auxiliary frame will be allowed to yield to tension of the record strip but when rotated in the other direction will return the auxiliary frame to normal position, means for rotating the rotatable member in the first mentioned direction to position that portion of the record strip normally in line with the opening, in position to be printed upon by the printing mechanism, means for operating the printing mechanism when the record strip is in this position, means for rotating the rotatable member in the reverse direction to release the record strip and move the auxiliary frame to return the record strip to original position, and means for finally feeding the record strip an additional step to position it for the next operation of the machine.

21. In a machine of the class described, the combination with printing mechanism, of a frame supporting a record strip, means for moving the record strip independently of the frame to position it to be printed upon by the printing mechanism, and then back to original position and means for giving it an additional feed in the last mentioned direction.

22. In a machine of the class described, the combination with a printing mechanism, of a frame supporting a record strip, a cover for the record strip having an opening, some distance from the printing mechanism, through which the record strip may be written upon, means for moving the record strip independently of the frame to position that portion adjacent the opening, in position to be printed upon by the printing mechanism, and then return it to original position adjacent the opening, and means for feeding the record strip an additional step in the last mentioned direction.

23. In a machine of the class described, the combination with a record strip carrying frame, feeding mechanism for the strip, and means for moving the record strip in a direction reverse to the feed to position it to be printed upon and then back to original position, comprising a movable rod supporting a portion of the record strip, a rotatable member engaging the record strip distant from the rod and carrying cams for controlling the movement of the rod, means for rotating the rotatable member and cams in one direction to cause the rotatable member to pull the record strip in a direction reverse to its feed and to cause the cams to allow the rod to yield to permit the record strip to move in this direction, and means for rotating the rotatable member in the reverse direction to release its hold upon the record strip and to move the cams to return the rod and thereby the record strip to normal position.

24. In a machine of the class described, the combination with a pivoted record strip carrying frame, a printing hammer carried by the frame, means for actuating the printing hammer from which the printing hammer is disconnected when the pivoted record strip carrying frame is swung about its pivot, record strip moving mechanism carried by the pivoted frame, actuating means therefor from which the moving mechanism is disconnected when the record strip frame is swung from normal position, and means whereby when the pivoted record strip carrying frame is swung from normal position the moving means and the printing hammer will not be dislocated but will remain in position to properly engage their corresponding actuating means when the record strip frame is returned to normal position.

25. In a machine of the class described, the combination with a drive shaft, of a plurality of cams thereon each having an undercut projection but undercut in opposite directions, a drawer locking lever, an arm rigid on the shaft having an end engaging with one of the cams on the drive shaft, an arm loose on the shaft having an end engaging with the other cam on the drive shaft, a spring tending to separate the arms, and a projection on one of the arms limiting the distance between the arms so that both cannot be out of the path of movement of the fingers on their respective cams at the same time, the relationship of the cams, arms, and undercut fingers being such that when the finger of one of the cams rides past its arm at the end of the operation of the machine the end of the other arm is positioned beneath the undercut finger of its cam to prevent further movement of the drive shaft in a forward direction.

26. In a machine of the class described, the combination with a drive shaft carrying a cam provided with a finger undercut in a rearward direction and a collar provided with a finger undercut in a forward direction, a shaft operating drawer unlocking mechanism, an arm rigidly carried by the shaft and adapted to be actuated by the cam, to operate the shaft, a second arm loose on the shaft coöperating with the finger on the collar, means tending to separate the upper ends of the arms, and means for limiting the separation of the arms so that both cannot be out of the path of their coöperating fingers at the same time.

27. In a machine of the class described, the combination with a drive shaft, a cam thereon, a collar, having a forwardly undercut locking projection, carried by the drive shaft, a pivoted arm, and means operated by the cam near the end of a rotation of the drive shaft for positioning the arm beneath the undercut projection on the collar to limit the rotation of the drive shaft.

28. In a machine of the class described, the combination with a drive shaft, a cam thereon, a collar, having a forwardly undercut locking projection, carried by the drive shaft, a drawer releasing lever, a shaft rigid with the lever, an arm rigid with the shaft and adapted to be operated by the cam to release the drawer, a second arm loosely mounted on the shaft, means whereby the cam near the end of the operation of the machine positions the second arm beneath the undercut locking projection on the collar to prevent a second rotation of the drive shaft, and also operates the first arm and shaft to release the cash drawer, and means whereby the cam after the end of an operation of drive shaft prevents rotation of said shaft in a reverse direction except for a slight distance to release the second arm from under the undercut projection on the collar to allow a subsequent forward rotation of the drive shaft.

29. In a machine of the class described, the combination with a transaction slide printing type positioned thereby, means whereby the adjustment of the slide controls the rocking of a counter into and out of engagement with actuators therefor, a movable member provided with a plurality of notches differentially adjusted by the transaction slide, a drive shaft, and a swinging member adapted to engage at one side in one of the notches and to be disengaged from the drive shaft at the other side when the transaction slide is in proper position for either operation of the machine, but when the transaction slide is not properly adjusted for either operation of the machine to engage at one side a high portion between the notches on the movable member and at the other side in locking engagement with the drive shaft to prevent rotation of the latter.

30. In a machine of the class described, the combination with a drive shaft, a swinging locking member therefor, a transaction slide and means controlled by the transaction slide and movable relative to the locking member for engaging the locking member with the drive shaft to prevent rotation of said shaft when the transaction slide is not properly adjusted for an operation of the machine.

31. In a machine of the class described, the combination with check feeding mechanism, including a clutch, a lever for operating the clutch, a check printing hammer, and connections whereby when the lever is in position to uncouple the clutch members to prevent feeding of a check, the check printing hammer is prevented from operation but when the lever is in position to couple the clutch members the check printing hammer is free to operate.

32. In a machine of the class described, the combination with check feeding mechanism including a clutch, of a lever for operating the clutch, and a projection carried by the lever for positively preventing the feeding of a check when the members of the clutch are operatively disengaged.

33. In a machine of the class described, the combination with coin display mechanism, normally open at the bottom, of means for closing the bottom of the coin display at each operation of the machine including a projecting arm, a drawer beneath the coin display, drawer locking mechanism, and an arm controlled thereby for engaging the first mentioned arm before the drawer is released after the bottom of the coin display has been closed, to hold it closed, and to be disengaged therefrom when the drawer is closed, and allow the bottom of the coin display to open, whereby the coin display is always closed when the drawer is open and not in position to receive coins therefrom.

34. In a machine of the class described, the combination with a drive shaft, of a locking member therefor, yielding means tending to hold the locking member out of locking engagement with the drive shaft, and a clerk's initial slide normally effective to hold the locking member in locking engagement with the drive shaft against the action of the yielding means but adapted to release the locking member upon the movement of the slide and allow the yielding means to withdraw it from locking engagement with the drive shaft.

35. In a machine of the class described, the combination with a check strip feeding roll, of an electro opposite the feeding roll, a sliding plate connected with the electro, and a shaft loosely mounted within the feeding roll provided with a cam operatively connected with the sliding plate whereby rotation of the shaft will cause movement of the sliding plate and electro relative to the feeding roll to permit insertion of or removal of a check strip from between the electro and the feeding roll.

36. In a machine of the class described, the combination with a check strip feeding mechanism supporting frame, of a feeding roll rotatively mounted in the frame, an electro journaled in notches in the frame, plates slidably mounted on the frame and provided with notches in which also the ends of the electro are located, springs tending to hold the sliding plates in position to hold the electro in place in the notches in the frame, a shaft provided at one end with a handle loosely journaled in the feeding roll and cams on the shaft adapted when the shaft is rotated to move the sliding plates against the tension of their springs and locate the notches therein so the electro may be removed from position in the notches of the frame.

37. In a machine of the class described, the combination of a movable totalizer carrying frame; a lever and operating means therefor for moving the frame; and means for withdrawing the fulcrum of the lever and positively locking the frame against movement so that movement of the lever does not affect the totalizer frame.

38. In a machine of the class described, the combination of a totalizer actuating device; a totalizer adapted to be moved into and out of engagement therewith; a lever operatively connected with the totalizer for giving it such movement; a cam for operating the lever; a rotatable member having an arcuate projection forming the fulcrum for said lever; and a manipulative means for rotating the rotatable member to withdraw the arcuate projection from supporting relationship with the lever and locking the totalizer out of engagement with its actuating mechanism.

39. In a machine of the class described, the combination of a totalizer; a movable support therefor; actuating mechanism for the totalizer; means for engaging the totalizer with its actuating mechanism; and a differentially adjustable member adapted to disable the engaging means and to engage the movable support and positively prevent movement of the latter.

40. In a machine of the class described, the combination of a totalizer drum; totalizer elements loosely mounted thereon; a driving member for the drum; and a single member mounted within the drum and movable to both connect the drum with its driving member and with the totalizer elements so that the latter may be driven by the drum.

41. In a machine of the class described, the combination of a normally stationary rotary drum; totalizer pinions loosely mounted thereon; driving mechanism; and means mounted within the drum movable to connect the latter with the driving mechanism and also to establish driving relationship of the drum to the totalizer pinions.

42. In mechanism of the class described, the combination of a movable member; means normally yieldingly holding the member against movement; and means movable in one direction to positively hold the first mentioned means in engagement with the movable member to prevent movement of the latter and movable in the opposite direction to positively carry said first mentioned means away from the movable member to completely free the latter for movement.

43. In a mechanism of the class described, the combination of a movable member; a pawl pivoted intermediate its ends and yieldingly held in engagement with said member; and means adapted to engage the pawl on one side of its pivot to lock the pawl in engagement with the movable member and on the other side of the pivot to positively carry the pawl out of engagement with said member.

44. In a machine of the class described, the combination with a supply roll for a record strip which is adapted to receive two classes of records, of means for moving the portion of the strip which has been fed off of the supply roll without any movement of the supply roll so that the surface of this portion of the strip which is adjacent to the surface in position to receive one class of record may be moved to receive the other class of record and then moved back to original position, and means for then advancing the record strip from the supply roll so that a fresh surface of the strip is in position to receive the one class of record.

45. In a machine of the class described, the combination with a supply roll and a receiving roll for a record strip which is adapted to receive two classes of records, of means for moving the portion of the strip between the two rolls without effecting any movement of the rolls so that that surface of the strip adjacent to the surface which is in position to receive one class of record may be moved to receive the other class of record and then moved back to original position, and means for then advancing the record strip from the supply roll on to the receiving roll so that a fresh surface of the strip is in position to receive the one class of record.

46. In a machine of the class described, the combination with an operating mechanism, of a supply roll and a receiving roll for a record strip which is adapted to receive two classes of records, means operated by the operating mechanism for moving a portion of the strip between the supply and receiving rolls without effecting any movement of the rolls so that the surface of the strip adjacent that in position to receive one class of record may be moved to receive the other class of record and then moved back to original position, a device operated by the operating mechanism for advancing the record strip from the supply roll to the receiving roll so that a new surface of the strip is in position to receive the one class of record, and means in the machine for giving the strip a record of the one class.

In testimony whereof I affix my signature in the presence of two witnesses.

JOHN A. WERNER.

Witnesses:
R. O. GLASS,
CARL W. BRUST.